(12) United States Patent
Grant et al.

(10) Patent No.: US 12,148,044 B2
(45) Date of Patent: Nov. 19, 2024

(54) COLLECTION OF CRASH DATA USING AUTONOMOUS OR SEMI-AUTONOMOUS DRONES

(71) Applicant: State Farm Mutual Automobile Insurance Company, Bloomington, IL (US)

(72) Inventors: Rosemarie G. Grant, Ellsworth, IL (US); Christina P. Mullen, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/716,787

(22) Filed: Apr. 8, 2022

(65) Prior Publication Data

US 2022/0230255 A1 Jul. 21, 2022

Related U.S. Application Data

(63) Continuation of application No. 17/085,605, filed on Oct. 30, 2020, now Pat. No. 11,423,489, which is a
(Continued)

(51) Int. Cl.
*G06Q 40/08* (2012.01)
*G05D 1/00* (2006.01)
(Continued)

(52) U.S. Cl.
CPC ........... *G06Q 40/08* (2013.01); *G05D 1/0094* (2013.01); *G05D 1/101* (2013.01); *G05D 1/689* (2024.01);
(Continued)

(58) Field of Classification Search
CPC ..................................................... G06Q 40/08
(Continued)

(56) References Cited

U.S. PATENT DOCUMENTS

| 8,346,578 | B1 | 1/2013 | Hopkins, III et al. |
| 9,019,092 | B1 | 4/2015 | Brandmaier et al. |

(Continued)

FOREIGN PATENT DOCUMENTS

| EP | 3239686 A1 | 11/2017 |
| EP | 3578433 B1 | 8/2020 |

(Continued)

OTHER PUBLICATIONS

Wikipedia, Unmanned Aerial Vehicle, Captured on Apr. 15, 2012 by Internet Archive WayBack Machine (Year: 2012).*

(Continued)

*Primary Examiner* — Cho Kwong
(74) *Attorney, Agent, or Firm* — Armstrong Teasdale LLP

(57) ABSTRACT

A method for collecting drone data at a crash site using an autonomous or semi-autonomous drone may include determining or receiving a crash GPS location associated with a crash location of a crash scene, and may further include generating a pre-generated flight path for an autonomous or semi-autonomous drone based upon the crash GPS location. The autonomous or semi-autonomous drone may be mounted, or held securely in place, on an emergency response vehicle traveling to the crash location. The method may further include autonomously or semi-autonomously flying the autonomous or semi-autonomous drone in accordance with the pre-generated flight path at the crash GPS location to generate or collect drone data associated with the crash scene. The drone data may be used for one or more insurance-related purposes, such as handling, adjusting, or generating auto or homeowners insurance claims; crash
(Continued)

reconstruction; fault determination; damaged vehicle repair; and/or buildup identification.

19 Claims, 7 Drawing Sheets

Related U.S. Application Data continuation of application No. 14/989,433, filed on Jan. 6, 2016, now Pat. No. 10,832,330.

(60) Provisional application No. 62/250,178, filed on Nov. 3, 2015, provisional application No. 62/180,830, filed on Jun. 17, 2015.

(51) Int. Cl.
  *G05D 1/689* (2024.01)
  *G05D 1/695* (2024.01)
  *G06Q 50/26* (2024.01)
  *G08G 1/00* (2006.01)
  *G08G 1/01* (2006.01)
  *G08G 5/00* (2006.01)
  *G08G 5/04* (2006.01)
  *B64U 80/86* (2023.01)
  *B64U 101/30* (2023.01)

(52) U.S. Cl.
  CPC .......... *G05D 1/695* (2024.01); *G06Q 50/265* (2013.01); *G08G 1/012* (2013.01); *G08G 1/205* (2013.01); *G08G 5/0034* (2013.01); *G08G 5/045* (2013.01); *B64U 80/86* (2023.01); *B64U 2101/30* (2023.01); *B64U 2201/10* (2023.01)

(58) Field of Classification Search
  USPC ........................................................... 705/4
  See application file for complete search history.

(56) References Cited

U.S. PATENT DOCUMENTS

| | | |
|---|---|---|
| 9,830,748 B2 | 11/2017 | Rosenbaum |
| 9,990,782 B2 | 6/2018 | Rosenbaum |
| 10,269,190 B2 | 4/2019 | Rosenbaum |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2002/0103622 A1 | 8/2002 | Burge |
| 2005/0004723 A1* | 1/2005 | Duggan .................. B64C 19/00 701/13 |
| 2009/0265193 A1 | 10/2009 | Collins et al. |
| 2010/0279647 A1 | 11/2010 | Jacobs et al. |
| 2012/0210853 A1* | 8/2012 | Abershitz ............... F41H 11/00 89/1.11 |
| 2013/0317861 A1 | 11/2013 | Tofte et al. |
| 2013/0317865 A1* | 11/2013 | Tofte ..................... G06Q 10/06 705/4 |
| 2014/0316614 A1 | 10/2014 | Newman |
| 2015/0172894 A1 | 6/2015 | Gabel |
| 2015/0363717 A1 | 12/2015 | Lim |
| 2016/0307449 A1 | 10/2016 | Gordon |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | 2017082756 A1 | 5/2017 |

OTHER PUBLICATIONS

Wikipedia, "Unmanned Aerial Vehicle", obtained by Internet Archive WayBack Machine on Apr. 15, 2012 with URL https://web.archive.org/web/20120415203542/https://en.wikipedia.org/wiki/Unmanned_aerial_vehicle, 20 Pages.

* cited by examiner

COLLECTION OF CRASH DATA USING AUTONOMOUS OR SEMI-AUTONOMOUS DRONES

CROSS-REFERENCE TO RELATED APPLICATIONS

This application is a continuation of, and claims the benefit of priority to, U.S. patent application Ser. No. 17/085,605, filed Oct. 30, 2020, which is a continuation of, and claims the benefit of priority to, U.S. patent application Ser. No. 14/989,433, filed Jan. 6, 2016, issued as U.S. Pat. No. 10,832,330 on Nov. 10, 2020, which claims the benefit of priority of U.S. Provisional Patent Application Ser. No. 62/180,830, filed Jun. 17, 2015, and U.S. Provisional Patent Application Ser. No. 62/250,178, filed Nov. 3, 2015, the entire contents and disclosures of which are hereby incorporated herein by reference in their entirety.

FIELD OF THE INVENTION

The present disclosure relates to collecting data using unmanned aerial vehicles (UAV) and, more particularly, to systems and methods for using UAVs for collecting vehicle crash data and transmitting the vehicle crash data to a remote computing system for storage and analysis.

BACKGROUND

Vehicle crashes occur on a daily basis in the United States and throughout the world. Vehicle crashes may involve one or more vehicles and may include collisions with other vehicles, collisions with other property, or collisions with people. Such vehicle crashes may result in damage to the vehicle, other property, or, in some cases, injury or loss of life to a person. When vehicle crashes occur, emergency response services such as law enforcement, firefighting services, and emergency medical services (EMS) may be called to the vehicle crash site to assist victims of the vehicle crash, manage traffic, remove debris, and provide other emergency response services. The emergency response services may alter the vehicle crash site (e.g., move vehicles involved in the crash) to assist the victims or to manage traffic. Accordingly, after such emergency services are provided, vehicle crash data (i.e., the location of the vehicles, type of vehicles, and other information regarding the vehicle crash) may not be representative of the actual vehicle crash.

After the emergency response services have been provided, law enforcement may then have to recreate the vehicle crash site to gather the actual vehicle crash data. However, the vehicle crash site may not be reproducible because some of the vehicles may have been moved and/or some of the vehicles may be total loss vehicles, where the damage to the vehicle is deemed unrepairable (e.g., a vehicle with substantial fire damage), and may lead to inaccurate vehicle crash data.

Recreating the crash scene after emergency response services have been provided may also add to the time necessary to process insurance claims associated with the vehicles involved in the crash. Because the crash scene is altered, assessment of the vehicle crash data by the insurance companies may require more time for processing the insurance claims. Delaying insurance claims processing may increase the costs associated with a vehicle crash for an insurance provider. For example, delays in processing an insurance claim for a vehicle may increase the costs for the insurance provider in providing a temporary rental car to a policy holder while the damaged vehicle is being repaired or replaced as rental car fees may be incurred for a longer duration.

BRIEF SUMMARY

The present embodiments may relate to systems and methods for collecting and processing vehicle crash data from a vehicle crash site of a vehicle crash with an unmanned aerial vehicle (UAV), commonly known as a drone, including at least one sensor. Preferably, the UAV may be autonomously or semi-autonomously controlled. The sensor may include, for example, a camera, a thermal camera, a Global Positioning System (GPS) sensor or unit, a range sensor, and an audio sensor. The UAV may be automatically deployed from an emergency response vehicle to collect the vehicle crash data with the at least one sensor. The UAV may transmit the vehicle crash data to a remote computing device and/or an insurance computing device to be processed. In some embodiments, the remote computing device may store the vehicle crash data and detect if the vehicle crash data includes a vehicle identifier. The remote computing device may then determine a first insurance provider is associated with a first vehicle of the vehicle crash based, at least in part, on the vehicle identifier. In other embodiments, the insurance computing device may process the vehicle crash data instead of the remote computing device. The insurance computing device may be configured to initiate a crash insurance claim based upon the vehicle crash data. For example, the insurance computing device may automatically populate an insurance claim form based, at least in part, on the vehicle crash data.

In one aspect, a computer-implemented method of collecting autonomous, semi-autonomous and/or other drone data for insurance-related purposes may be provided. The method may include determining or receiving, via one or more processors, a crash GPS location associated with a crash location of a crash scene, the crash GPS location associated with an insurance-related event occurring at the crash scene. The method may further include generating, at the one or more processors, a pre-generated flight path for an autonomous or semi-autonomous drone based upon the crash GPS location. The autonomous or semi-autonomous drone may be mounted, or held securely in place, on an emergency response vehicle traveling to the crash location. The method may further include, once the emergency response vehicle arrives at the crash scene, autonomously or semi-autonomously flying the autonomous or semi-autonomous drone in accordance with the pre-generated flight path at the crash GPS location to generate or collect drone data associated with the crash scene. The method may further include determining, via the one or more processors, an extent of vehicle or building damage caused by the insurance-related event from computer analysis of the drone data collected while the autonomous or semi-autonomous drone is flying the pre-generated flight path. The method may further include using, via the one or more processors, the extent of vehicle or building damage determined from computer analysis of the drone data to facilitate mitigating further damage or for further insurance-related purposes. The method may include additional, less, or alternate actions, including those discussed elsewhere herein.

In another aspect, a computer-implemented method of collecting autonomous, semi-autonomous and/or other drone data for insurance-related purposes may be provided. The method may include determining or receiving, via one or more processors, a crash GPS location associated with a crash location of a crash scene. The crash GPS location may be associated with an insurance-related event occurring at the crash scene. The method may further include generating, at the one or more processors, a pre-generated flight path for an autonomous or semi-autonomous drone based upon the crash GPS location, including a length and/or width of the crash scene, or a radius around the crash GPS location. The autonomous or semi-autonomous drone may be mounted, or held securely in place, on an emergency response vehicle traveling to the crash location. The method may further include, once the emergency response vehicle arrives at the crash scene, autonomously or semi-autonomously flying, under the direction and control of the one or more processors, the autonomous or semi-autonomous drone in accordance with the pre-generated flight path at the crash GPS location to collect drone data associated with the crash scene to facilitate using the drone data for insurance-related activity. The method may include additional, less, or alternate actions, including those discussed elsewhere herein.

In yet another aspect, a computer-implemented method of collecting autonomous or semi-autonomous drone data for insurance-related purposes may be provided. The method may include determining or receiving, via one or more processors mounted on an autonomous or semi-autonomous drone, a GPS crash location associated with an insurance-related event occurring at a crash scene. The method may further include generating, at the one or more processors mounted on the autonomous or semi-autonomous drone, a pre-generated flight path for the autonomous or semi-autonomous drone based upon the GPS crash location. The autonomous or semi-autonomous drone may be mounted, or held securely in place, on an emergency response vehicle traveling to the GPS crash location. The method may further include, once the emergency response vehicle arrives at the crash scene, autonomously or semi-autonomously flying, under the direction and control of the one or more processors mounted on the autonomous or semi-autonomous drone, the autonomous or semi-autonomous drone in accordance with the pre-generated flight path at the GPS crash location to collect drone data associated with the crash scene to facilitate using the drone data for insurance-related activity. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
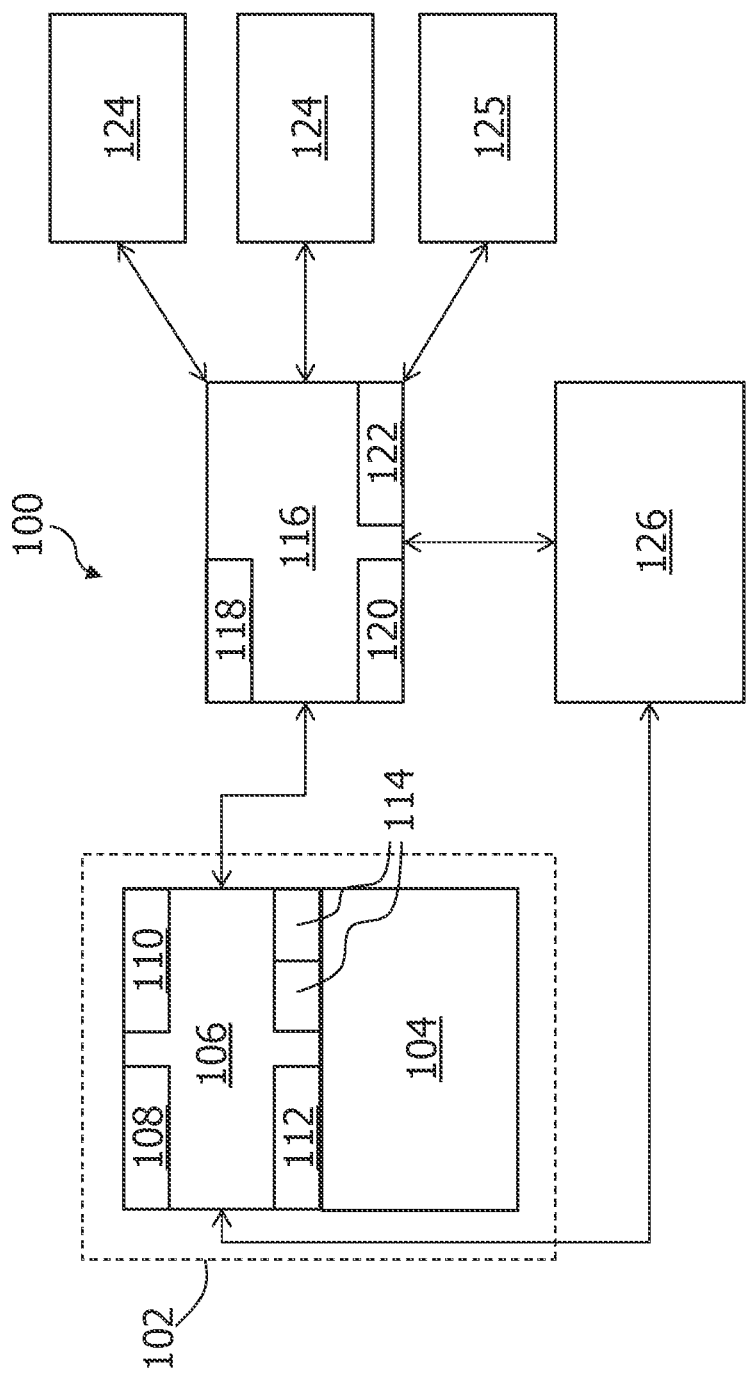
FIG. 1 illustrates an exemplary vehicle crash data collection system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for using unmanned aerial vehicles (UAVs), such as autonomous or semi-autonomous UAVs, to collect vehicle crash data at a vehicle crash site, and transmit the vehicle crash data to a remote computing device for storage and processing. As used herein, a UAV is sometimes also referred to as a "drone." At a vehicle crash site involving one or more vehicles, an emergency response unit may arrive at the vehicle crash site to provide emergency response services, such as firefighting, law enforcement, and emergency medical services (EMS). The emergency response unit may include, but is not limited to, a firefighting vehicle, an ambulance, a law enforcement vehicle, and/or any other unit related to an emergency response service. As used herein, a "vehicle crash site" refers to the location of a vehicle crash and any surrounding area and/or objects relevant to the vehicle crash.

In the exemplary embodiment, the emergency response unit may be configured to automatically deploy a primary UAV (such as an autonomous or semi-autonomous UAV) with at least one sensor at the vehicle crash site. The UAV may be configured for autonomous aerial deployment, such that the UAV may fly over the vehicle crash site and gather vehicle crash data under the direction or control of a processor or processors. The UAV sensor may include, for example, a camera, a video recorder, a thermal camera, a range sensor, a Global Positioning System (GPS), and/or an audio sensor. The UAV may automatically collect vehicle crash data while the emergency response unit assists any victims of the vehicle crash and manages the vehicle crash site. As used herein, "vehicle crash data" refers to data relating to the vehicle crash, the victims of the vehicle crash, and/or the vehicle crash site. Vehicle crash data may include, but is not limited to, time data (i.e., a timestamp), image data, video data, thermal data, GPS data, range data (i.e., data regarding the distance between a plurality of objects), audio data, and/or any other data that the UAV may be configured to capture.

In the exemplary embodiment, the UAV may be in communication with the emergency response unit or with a remote emergency response location to provide the vehicle crash data, which may include the location of victims and hazardous materials. Additionally, the UAV may scan for a vehicle identifier, such as a license plate number and/or license plate issuing State, a vehicle identification number (VIN), or any other identifier to determine the owner of the vehicle (and/or auto insurance provider for the vehicle). The UAV may be configured to store the vehicle crash data for transmission, and a transceiver for transmitting the vehicle crash data via wireless communication or data transmission.

The UAV may transmit the vehicle crash data to a remote computing device having a processor and a memory to be stored. The remote computing device may be in communication with the emergency response unit, at least one insurance provider via an insurance computing device, a user device (such as a mobile device) associated with the owner or insured of the corresponding vehicle, and an administration computing device described below. An insurance provider may include an insurance carrier or a third party related to the insurance carrier associated with the vehicle in question, a person, and/or other property involved in the crash.

The remote computing device may determine if the received vehicle crash data includes any vehicle identifiers. If the vehicle crash data includes vehicle identifiers, the remote computing device may (i) identify the vehicle owners and/or the associated insurance providers by, for example, comparing the vehicle identifiers to a lookup table, (ii) transmit a notification with the vehicle identifiers to at least a portion of the insurance computing devices, and/or (iii) transmit the vehicle identifiers to a third party remote computing device.

After identifying the associated insurance providers, the remote computing device may send the vehicle crash data to the insurance computing devices of the associated insurance providers for insurance claims processing. If the vehicle crash data does not include vehicle identifiers, the remote computing device may store the vehicle crash data. The associated insurance providers may send them a request with search information, such as time, date, and/or location of the crash to the remote computing device for the vehicle crash data when the insured files a claim with the insurance provider. If the remote computing device identifies the vehicle crash data based upon the search information, the remote computing device may transmit the vehicle crash data to the associated insurance providers.

The administration computing device may be a third party computing device in communication with the remote computing device to transmit and/or receive vehicle crash data and additional crash information. In the exemplary embodiment, the administration computing device may be implemented by an emergency response service provider (e.g., law enforcement). Additionally or alternatively, the administration computing device may be implemented by a third party, such as a government organization or other parties that may benefit from the vehicle crash data. The additional crash information may include driver and/or passenger information (e.g., name, address, driving history, medical information, identification photo, etc.), freight information (e.g., hazardous materials), and/or other data relevant to the vehicle crash. The remote computing device may send the additional crash information to the associated insurance providers.

The administration computing device may be associated with various entities, such as fire departments, police departments, hospitals or ambulances, or other first responders. The drone and/or other data collected may relate to, or be indicative of, response times to a vehicle crash, house fire, or other event/emergency; number of units responding; and/or indicative of which types of units responded, or how those units responded. The drone and/or other data collected may be used for post-event or post-crash review and to provide some quantitative information (times, etc.) for first responder training. For instance, EMS leads (e.g., fire chief, police chief, etc.) may use the drone and/or other data collected for post-event review for their staffs to assess performance, review the adequacy of the response to an event, apply or improve upon best practices, etc. In some embodiments, the drone and/or other data collected may be used for performance evaluation, and also used for overall training and during review periods.

The associated insurance providers may use the vehicle crash data and the additional crash information provided by the administration computing device to process insurance claims. In the exemplary embodiment, computing devices associated with the insurance providers may receive the vehicle crash data and/or may automatically populate an insurance claim form (such as a virtual insurance claim form or webpage) within the insurance provider computing device. By so doing, the time for processing such insurance claims may be significantly reduced. Additionally, the associated insurance carriers may determine if a vehicle is a 'total loss' (i.e., the vehicle is not repairable) using the vehicle crash data.

In an additional embodiment, the emergency response unit may be configured to automatically deploy several secondary UAV or drones (such as autonomous or semi-autonomous drones) with at least one sensor at the vehicle crash site. The secondary drones may be configured for autonomous aerial deployment, such that as the primary UAV flies over the vehicle crash site and gathers vehicle crash data, the secondary drones may be deployed by, or from, the emergency response unit. Each of the secondary drones may include for example, processors, memory, a camera, a video recorder, a thermal camera, a range sensor, a Global Positioning System (GPS), and/or an audio sensor. The secondary drones may be automatically, or otherwise, directed downstream of an vehicle crash or other emergency scene to intercept vehicles that have not yet made it to the vehicle crash (or other emergency scene) location in order to warn those vehicles and drivers to slow down, stop, or reroute—potentially preventing additional vehicle crashes as traffic backs up. For instance, the secondary or backup drones may travel down a road and hover a predetermined distance from the scene of the event/emergency—such as a half mile or a mile, or at an intersection or exit ramp to divert traffic to an alternate route. The secondary drones may generate warnings to drivers of the event/emergency, such as flashing lights or with luminescent banners.

Data collected by the autonomous or semi-autonomous secondary drones may be transmitted to the emergency response unit, third party computing devices, insurance provider servers, and/or other computing devices, including those discussed herein. The secondary drone data may be transmitted via wireless communication or data transmission—either via a dedicated data stream or broadcast, or after being combined with drone and/or other data (such as the drone data collected by the primary UAV mentioned above).

At least one of the technical problems addressed by this system may include: (i) conventional collection of inaccurate vehicle crash data; (ii) limited vehicle crash data may be typically collected after a vehicle crash site is altered; (iii) conventionally, only limited information may be provided for, and/or by, an emergency response service at the vehicle crash site; (iv) road restrictions during a crash response may impeded conventional emergency response; and/or (v) conventional techniques may result in delayed insurance claims processing.

A technical effect of the systems and processes described herein may be achieved by performing at least one of the following steps: (a) deploying, at a vehicle crash site, a UAV having at least one sensor, wherein the at least one sensor includes at least one of a camera, a video camera, a thermal camera, a GPS, a range sensor, and an audio sensor from an emergency response unit, wherein the UAV is programmed to navigate a vehicle crash site and operate the at least one sensor; (b) collecting "vehicle crash data" from the vehicle crash site with the UAV, wherein the vehicle crash data includes at least one of time data, image or video data, thermal data, location data (e.g., GPS data or range data), and audio data; (c) transmitting the vehicle crash data to an emergency response service (and/or insurance provider remote server); (d) transmitting the vehicle crash data to an remote computing device for storage (and/or analysis, further transmission, and/or subsequent computer access); (e) identifying an insurance provider such as an insurance carrier, a policy holder, or a third party related to insurance associated with a vehicle at the vehicle crash site (or via a remote processor or server); and/or (f) transmitting the vehicle crash data to an insurance computing device of the insurance provider.

The resulting technical effect achieved by this system may be that vehicle crash data collection of a vehicle crash site may be performed before the vehicle crash site is altered by emergency response services. In addition, the vehicle crash data may be accessible by emergency response service providers and/or insurance providers to facilitate a response to the vehicle crash (e.g., an emergency response service may locate the number of cars involved in crash using the vehicle crash data, and/or an insurance carrier may pre-populate a virtual insurance claim (for insured subsequent review, medication, and/or approval) form using the vehicle crash data). The vehicle crash data may be received by an insurance provider computing device and/or automatically populates insurance claim forms such that insurance claim forms associated with the crash may be quickly and efficiently prepared.

As used herein, vehicle crash site refers to the location of the vehicle crash and any surrounding area relevant to the vehicle crash. The vehicle crash site may be defined by any radial distance from the vehicle crash such as, for example, 50 meters, 75 meters, 100 meters, 200 meters, or more. Additionally or alternatively, the vehicle crash site may be defined by a plurality of regions of interest (ROI), such as a victim ejected from a vehicle and/or debris affecting traffic (or debris field). In some embodiments, the vehicle crash site may be pre-defined. In other embodiments, the vehicle crash site may be defined by the vehicle crash. The above examples are example only, and are thus not intended to limit in any way the definition and/or meaning of the term "vehicle crash site."

As used herein, vehicle crash data refers to any data collected at a vehicle crash site. Vehicle crash data may include, for example, time data (i.e., a timestamp), image data, video data, thermal data, dimensional data, position data, and/or other types of data to quantify a vehicle crash. In addition, vehicle crash data may include pattern recognition data for identifying information from the collected data at the vehicle crash site, such as brand/model of vehicle, license plate numbers and/or States, the number of cars involved, the number of persons involved, the number of persons injured, the severity of vehicle damage (and/or whether a "total loss" condition exists), and/or hazardous materials (HAZMAT). Vehicle crash data may further include metadata, such as the types of data included in the vehicle crash data and the size of each type of data. The above examples are example only, and are thus not intended to limit in any way the definition and/or meaning of the term "vehicle crash data."

I. EXEMPLARY VEHICLE CRASH DATA COLLECTION SYSTEM

FIG. 1 depicts an exemplary vehicle crash data collection system 100. System 100 may include an emergency response unit 104, a UAV 106, a remote computing device 116, at least one insurance computing device 124, a user device 125, and/or an administration computing device 126. System 100 may collect, store, and transmit vehicle crash data from a vehicle crash site (not shown in FIG. 1) to facilitate a response to a vehicle crash (not shown in FIG. 1). The system 100 may include additional, fewer, or alternate components, including those discussed elsewhere herein.

Emergency response unit 104 may include an emergency response vehicle operated by an emergency service provider such as, but not limited to, law enforcement, firefighting service providers, medical service providers, and/or government organizations. In some embodiments, emergency response unit 104 may be any kind of land, nautical, or aeronautical vehicle. Emergency response unit 104 may arrive at the vehicle crash site to provide emergency services, manage the vehicle crash, and/or collect vehicle crash data (and/or stored and/or transmit/relay the vehicle crash data collected). In the exemplary embodiment, UAV 106 may be coupled to emergency response vehicle 104.

UAV 106 may include at least one processor 108 for executing instructions, a memory area 110, a communication module 112, and/or at least one sensor 114. Processor 108 may include one or more processing units (e.g., a multi-core configuration). Processor 108 may be communicatively coupled to memory area 110, communication module 112, and/or sensors 114. Memory area 110 may be any device allowing information, such as executable instructions and/or vehicle crash data to be stored and retrieved. Memory area 110 may include one or more computer-readable media. Communication module 112 may be configured to transmit and receive data with other devices such as, but not limited to, remote computing device 116 and/or administration computing device 126. In some embodiments, communication module 112 may be communicatively coupled to a remote device (not shown) to permit an operator (not shown) to control UAV 106 as described further below. The remote device may be located at the vehicle crash site or a remote location.

Sensors 114 may be configured to collect vehicle crash data. Sensors 114 may include any type of sensor such as a camera, a video recorder, a thermal camera, a range sensor, a GPS unit, an audio recorder, and/or sensors. In the exemplary embodiment, processor 108 may control the operation of sensors 114. In other embodiments, sensors 114 may include a processor and memory area (not shown) to capture and process vehicle crash data autonomous of processor 108. Each sensor 114 may be operated independently or dependently of other sensors 114. For example, in some embodiments in which sensors 114 may include a GPS unit and another sensor, the GPS unit may be configured to capture GPS data concurrently with the other sensor. Sensors 114 may include user-defined settings to control the operation of sensors 114 (e.g., a camera sensor may have image resolution and image acquisition rate settings). Sensors 114 may be the same type of sensor (e.g., two camera sensors) or different types of sensors. In some embodiments, sensors 114 may send the captured data to processor 108 for data processing (e.g., processing image data to identify a license plate of a vehicle) as described further below.

UAV 106 may be communicatively coupled to remote computing device 116. Alternatively, system 100 may not include remote computing device 116. Insurance computing devices 124 may be communicatively coupled to UAV 106 and/or perform the functions of remote computing device 116, such as described herein. Remote computing device 116 may be associated with and/or maintained by any one of an emergency response service provider, an insurance provider, and/or any other third party. Remote computing device 116 may further be communicatively coupled to insurance computing devices 124, user device 125, and/or administration computing device 126. In some embodiments, system 100 may include a plurality of administration computing devices 126. Remote computing device 116 may be a server computer device as described herein and may include at least one processor 118, a memory area 120, and/or a communication module 122. In some embodiments, remote computing device 116 may include a plurality of computer server devices communicatively coupled to each other. Remote computing device 116 may be configured to transmit and/or receive data that may include, but is not limited to, vehicle crash data from UAV 106, search queries from insurance computing devices 124, and/or additional crash information from administration computing device 126. In the exemplary embodiment, remote computing device 116 may receive the vehicle crash data from UAV 106 and store the vehicle crash data (such as for subsequent analysis and/or data transmission to additional computing devices).

Remote computing device 116 may be configured to determine if the vehicle crash data includes any vehicle identifiers, such as a license plate number when remote computing device 116 receives the vehicle crash data from UAV 106. Additionally or alternatively, UAV 106, insurance computing device 124, and/or administrator device 126 may be configured to determine if the vehicle crash data includes any vehicle identifiers. In the exemplary embodiment, remote computing device 116 may be configured to conduct pattern recognition on image data from the vehicle crash data to detect a vehicle identifier. For example, remote computing device 116 may identify a license plate number of a vehicle in an image or video of the vehicle crash data. Additionally or alternatively, remote computing device 116 may detect vehicle identifiers using other methods.

If remote computing device 116 determines the vehicle crash data includes a vehicle identifier, remote computing device 116 may search to find an owner of the vehicle and/or an insurance provider associated with the vehicle. Remote computing device 116 may search for the owner of the vehicle or the associated insurance provider by, for example, comparing the vehicle identifier to a list stored in memory 120, querying insurance computing devices 124 and/or administration computing device 126, and/or searching an external source, such as an external database (not shown). If remote computing device 116 determines the vehicle crash data does not include any vehicle identifiers, remote computing device 116 may store the vehicle crash data (and/or transmit the vehicle crash data to another computer device, processor, or server, such as via wireless communication or data transmission).

Remote computing device 116 may be configured to organize the vehicle crash data such that the vehicle crash data is searchable by insurance computing devices 124 and/or administration computing device 126. For example, insurance computing device 124 may send a search query including at least one of, but not limited to, a time, a date, a location of a vehicle crash, and/or a model of a vehicle (and/or number of vehicles, and/or severity of vehicle damage of vehicles) involved in the vehicle crash to remote computing device 116 to identify the vehicle crash data. In some embodiments, remote computing device 116 may be configured to send search results in response to a search query. The search results may include, for example, a portion of relevant vehicle crash data, metadata associated with relevant vehicle crash data (e.g., a time and date when the vehicle crash data was uploaded), and a number of hits, or relevant vehicle crash data (including number of vehicles involved and/or vehicle damage severity), from the search query.

Remote computing device 116 may include selective filters to limit the vehicle crash data viewable by insurance providers and third parties not involved with the vehicle crash. In some embodiments, remote computing device 116 may include a history log (not shown) to monitor any activity involving remote computing device 116 including information such as, for example, each search or download request, time, and/or identity (e.g., a user name, an Internet Protocol address, a company identifier, etc.) of the requester.

Each insurance computing device 124 may be associated with an insurance provider. The insurance provider may include an insurance carrier or a third party related to an insurance carrier associated with a vehicle, a person, and/or other property. In the exemplary embodiment, at least one insurance provider may be associated with a vehicle, a person, and/or other property involved in the vehicle crash. In some embodiments, none of the insurance providers may be associated with the vehicle crash (e.g., the vehicles involved in the crash are uninsured). Insurance computing devices 124 may be server computer devices as described herein, or other computing devices.

In addition, insurance computing devices 124 may include any communication means to transmit and receive data with system 100. Each insurance computing device 124 may be communicatively coupled to remote computing device 116 to determine if any of the vehicle crash data stored in remote computing device 116 involves a vehicle associated with (i.e., insured by) the insurance provider. In other embodiments, insurance computing devices 124 may be communicatively coupled to UAV 106 and replace remote computing device 116. Insurance computing devices 124 may send search queries and/or download requests to remote computing device 116 to retrieve the vehicle crash data. In some embodiments, each insurance computing device 124 may communicate with other insurance computing devices 124 if the insurance provider of the insurance computing device 124 identifies a vehicle from the vehicle crash data that is associated with another insurance provider. In other embodiments, the insurance computing device 124 may transmit a notification to the remote computing device 116 to send the vehicle crash data to the insurance computing device 124 of the other insurance provider. In the exemplary embodiment, the insurance provider(s) may use the vehicle crash data to process an insurance claim such as, but not limited to, populating an insurance claim form or determining a vehicle is considered a "total loss".

User device 125 may be associated with an insurance policy holder or a vehicle owner. User device 125 may include, for example, a computer, a laptop, a tablet, a smartphone, and/or a kiosk terminal. User device 125 may include a mobile device (such as a smartphone, laptop, tablet, phablet, wearable electronics, smart glasses, smart watch or bracelet, PDA (personal digital assistant), pager, or other mobile computing device or mobile device configured for RF (radio frequency) wireless communication and/or data transmission). In the exemplary embodiment, user device 125 may be communicatively coupled to remote computing device 116 to receive the vehicle crash data. User device 125 may be in communication with insurance computing devices 124. In some embodiments, user device 125 may interface with remote computing device 116 and/or insurance computing devices 124 via a software application. User device 125 may access the vehicle crash data to initiate a crash insurance claim similar to insurance computing devices 124. In some embodiments, user device 125 may have restricted access to the vehicle crash data stored in remote computing device 116. In certain embodiments, remote computing device 116 and/or insurance computing devices 124 may send notifications regarding the vehicle crash or the crash insurance claim to the policy holder or the vehicle owner via user device 125.

Administration computing device 126 may be implemented an administrative service provider such as, but not limited to, law enforcement, an EMS provider, government service provider, and/or another third party service provider, such as an insurance provider. In some embodiments, system 100 may include a plurality of administration computing devices 126. Alternatively, administration computing device 126 may be implemented by a plurality of third parties. Administration computing device 126 may include a server computer device as described herein. Administration computing device 126 may further include any communication means to transmit and receive data with system 100. In certain embodiments, administration computing device 126 may be communicatively coupled to emergency response unit 104 and/or UAV 106 to manage the vehicle crash site and/or collect (and/or store or transmit) the vehicle crash data.

In some embodiments, administration computing device 126 may request vehicle crash data from UAV 106. Additionally or alternatively, administration computing device 126 may remotely operate UAV 106 to assist any emergency responders (i.e., emergency response members at the vehicle crash site), and/or collect (and store and/or transmit) the vehicle crash data. Administration computing device 126 may send additional crash information such as, but not limited to, vehicle identifier, victim or vehicle occupant information, vehicle damage severity data, victim injury severity data, and/or freight information (e.g., HAZMAT, other deliverable goods, etc.) to remote computing device 116. In the exemplary embodiment, emergency response service may correct any inconsistencies or errors from the vehicle crash data collected by UAV 106. Administration computing device 126 may also request vehicle crash data from remote computing device 116. For example, where administration computing device 126 is implemented by law enforcement, administration computing device 126 may use the requested vehicle crash data to populate, or pre-populate portions of, a Police Accident Record.

In at least some embodiments, administration computing device 126 may request the vehicle crash data and/or additional data (e.g., video data captured before arriving at the vehicle crash site) from UAV 106 to evaluate performance of emergency response members at the vehicle crash site. For example, the vehicle crash data may include video data of the emergency response members as the members perform emergency services. Although UAV 106 and the vehicle crash data described herein are used at vehicle crash sites, it is to be understood that UAV 106 may be deployed during training scenarios or performance evaluations of emergency response members to collect performance data associated with the emergency response members.

For instance, as noted previously, the drone and/or other data collected may be analyzed and then used for post-event or post-crash review, event/emergency reconstruction and/or event/emergency response reconstruction, and may provide some quantitative information (times, etc.) for first responder training. EMS leads may use the drone and/or other data collected, and event/emergency response reconstruction for post-event review for their staffs to assess performance, review the adequacy of the response to an event, apply or improve upon best practices, etc.

II. EXEMPLARY EMERGENCY RESPONSE UNIT

Figure 2:
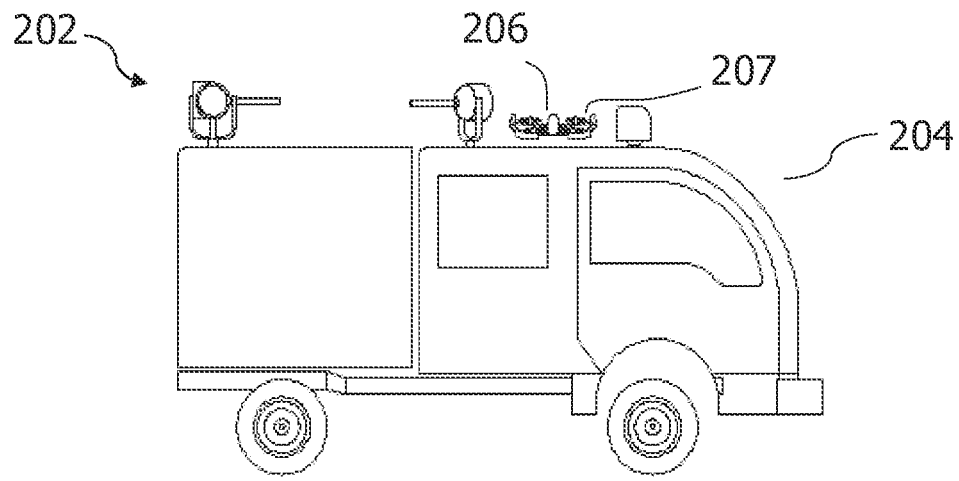
FIG. 2 illustrates an exemplary emergency response unit having an unmanned aerial vehicle (UAV) (such as autonomous or semi-autonomous UAV) that is part of a vehicle crash data collection system, such as the system shown in FIG. 1.

FIG. 2 depicts an exemplary emergency response unit 202 that includes an emergency response vehicle 204 and a UAV 206 coupled to the emergency response vehicle 204. Emergency response unit 202 may be used in a vehicle crash data collection system, such as system 100 shown in FIG. 1. Emergency response unit 202 may be similar to emergency response unit 102 and, in the absence of a contrary representation, the same reference numbers identify the same or similar elements. In the exemplary embodiment, emergency response vehicle 204 may be a fire engine, ambulance, police vehicle, and/or other emergency response vehicle.

UAV 206 may be removably coupled to the top of emergency response vehicle 204 such that UAV 206 is secured while traveling and deployable at the vehicle crash site. In other embodiments, UAV 206 may be stored in emergency response vehicle 204. UAV 206 may be configured to deploy automatically or manually by an operator, such as a local or remote operator controlling the UAV via wireless communication and/or data transmission. The operator may include an emergency responder, an operator in communication with UAV 206 via a remote device, such as administration computing device 126, and/or a third party operator (including an operator associated with an insurance provider).

In the exemplary embodiment, UAV 206 may be configured to fly to provide overhead vehicle crash data from the vehicle crash site. UAV 206 may include any components to enable UAV 206 to fly, such as rotors, propulsion systems, wings, and/or balloons. In the exemplary embodiment, UAV 206 includes rotors 207. In other embodiments, UAV 206 may deployed by other means besides flying to enable UAV 206 to collect, locally store, and/or transmit to another computing device, the vehicle crash data. The UAV may be autonomously, semi-autonomously, or even manually, controlled.

In one embodiment, the emergency response vehicle 204 may deploy the UAV 206 as a primary drone for direct data gathering at the event/emergency scene. The emergency response vehicle 204 may also deploy several secondary autonomous or semi-autonomous drones for scene control and security. The secondary drones may be used to divert or re-route traffic to make traveling safer for subsequent vehicles, as well as to keep unnecessary persons away from a scene having injured persons in need of medical attention.

As an example, the secondary drones may be automatically, or otherwise, directed downstream of an vehicle crash or other emergency scene to intercept vehicles that have not yet made it to the location of a vehicle crash (or other emergency) in order to warn those vehicles and drivers to slow down, stop, or reroute—potentially preventing additional vehicle crashes. For instance, the secondary or backup drones may travel down a road and hover a predetermined distance from the scene of the event/emergency, and generate warnings indicative of the event/emergency, such as flashing lights or audible warnings.

III. EXEMPLARY UAV DEPLOYMENT AT A CRASH SCENE

Figure 3:
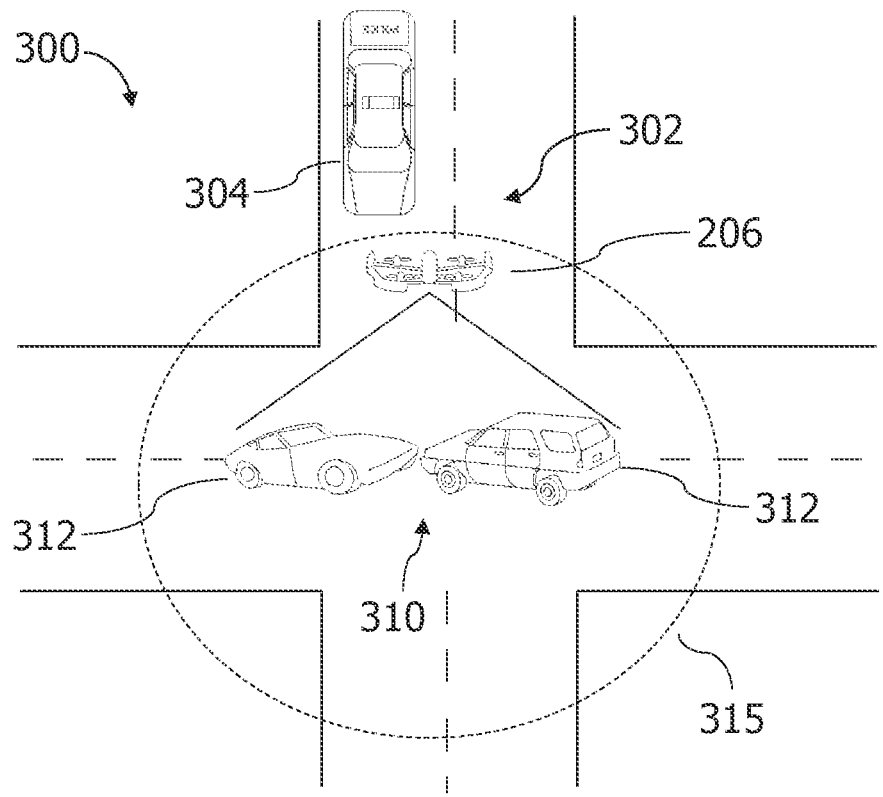
FIG. 3 illustrates an exemplary vehicle crash scene and an emergency response unit gathering vehicle crash data for use by a vehicle crash data collection system, such as the system shown in FIG. 1.

FIG. 3 depicts an exemplary crash scene 300 with an emergency response unit 302 which includes an emergency response vehicle 304 and UAV 206. In the exemplary embodiment, crash scene 300 may include a vehicle crash 310 involving a first vehicle 312 and a second vehicle 314 in a front end collision at a four-way intersection. Additionally or alternatively, crash scene 300 may include a different number of vehicles, a different collision scenario, debris from vehicle crash 310, people, and/or other property. A vehicle crash site 315 may be defined around the location of vehicle crash 310 and/or any surround locations relevant to vehicle crash 310.

Emergency response unit 302 may be used in a vehicle crash data collection system, such as system 100 shown in FIG. 1. Emergency response unit 302 may be similar to emergency response unit 102 and 202 and, in the absence of a contrary representation, the same reference numbers identify the same or similar elements. In the exemplary embodiment, emergency response vehicle 304 may be a law enforcement vehicle (or fire department vehicle or ambulance).

FIG. 3 illustrates UAV 206 deployed from emergency response vehicle 304 over vehicle crash 310. In the exemplary embodiment, UAV 206 may be configured to fly over vehicle crash site 315 using a region-of-interest (ROI) flight pattern such that UAV 206 flies over ROIs such as any vehicles involved in vehicle crash 310, victims, and/or each vehicle's route to vehicle crash 310. The ROIs may be identified by UAV 206 and/or the operator. In other embodiments, UAV 206 may fly a pre-defined pattern over vehicle crash site 315. The pre-defined pattern may include, for example, flying over a circumferential area of a radial distance from vehicle crash 310 and/or a distance of the road near vehicle crash 310. In some embodiments, UAV 206 may be controlled manually by the operator, such as a local or remote operator. In further embodiments, UAV 206 may include a plurality of selectable flight modes such as, but not limited to, ROI, automatic (i.e., pre-defined), and manual (such as entered by local or remotely located operators).

In addition, sensors 114 (not shown in FIG. 3) of UAV 206 may be controlled to gather vehicle crash data from vehicle crash site 315. For example, UAV 206 may control sensors 114 to determine the location of the vehicles involved, the location of the vehicles relative to any infrastructure (e.g., curbs, road centerlines, bridges, power poles, buildings, etc.), the number and type of the vehicles involved, the location of debris from vehicle crash 310, the location of victims including victims ejected from the vehicle, the severity of damage to vehicles, whether or not any vehicle involved is a total loss, the severity of the injuries to the victims, and/or any hazardous material involved by identifying HAZMAT placards or other identifiers.

In some embodiments, UAV 206 may continuously collect vehicle crash data. In other embodiments, UAV 206 may collect vehicle crash data at ROIs or other discrete locations (e.g., the operator manually operates sensors 114). In the exemplary embodiment, each sensor 114 of UAV 206 may be configured separately to provide either continuous or discrete data. For example, a thermal camera of sensors 114 may be configured to continuously capture thermal image data while a range sensor of sensors 114 may not collect distance data until a specific distance (e.g., the distance of the vehicles to infrastructure) is measured.

IV. EXEMPLARY VEHICLE CRASH DATA FLOW

Figure 4:
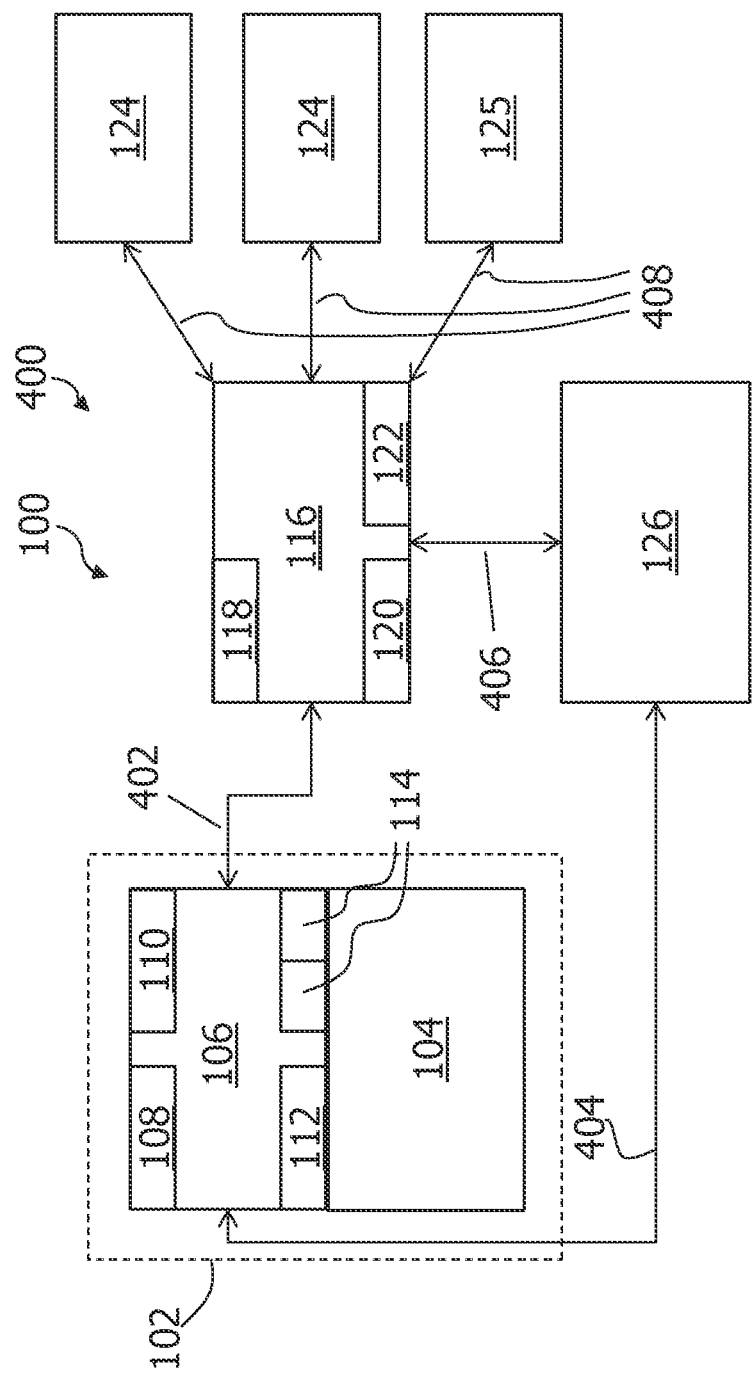
FIG. 4 illustrates an exemplary vehicle crash data flow of the vehicle crash data collection system shown in FIG. 1.

FIG. 4 depicts an exemplary diagram of a vehicle crash data flow 400 that may be used in a vehicle crash data collection system, such as system 100 shown in FIG. 1. Vehicle crash data flow 400 may include a first data communication 402, a second data communication 404, a third data communication 406, and/or a fourth data communication 408. Vehicle crash data flow 400 may include additional, fewer, or alternate data communications, including those discussed elsewhere herein.

First data communication 402 may be a data communication between UAV 106 and remote computing device 116. Specifically, first data communication 402 may be data transferred between communication module 112 of UAV 106 and communication module 122 of remote computing device 116. In the exemplary embodiment, UAV 106 may transmit vehicle crash data to remote computing device 116 using first data communication 402. The vehicle crash data may be structured such that remote computing device 116 may identify what type of data (e.g., image data, video data, audio data, map data, thermal data, etc.) is included in the vehicle crash data. For example, the vehicle crash data may include metadata identifying the type of data including in the vehicle crash data. Remote computing device 116 may communicate with UAV 106 to notify UAV 106 of any transmission errors or missing vehicle crash data. In some embodiments, remote computing device 116 may request that the vehicle crash data includes specific information such as, but not limited to, a timestamp, GPS data, image data, and/or video, map, or audio data.

Second data communication 404 may be a data communication between UAV 106 and administration computing device 126. Administration computing device 126 may communicate with UAV 106 to assist with responding to a vehicle crash. In some embodiments, administration computing device 126 may be in communication with UAV 106 to receive vehicle crash data without accessing remote computing device 116. Administration computing device 126 may store the vehicle crash data. In the exemplary embodiment, UAV 106 may be remotely accessed by administration computing device 126 using second data communication 404 to operate UAV 106 and/or request specific data to be collected (e.g., administration computing device 126 may request priority be given to thermal image data to locate victims of the vehicle crash).

Third data communication 406 may be a data communication between remote computing device 116 and administration computing device 126. In the exemplary embodiment, remote computing device 116 may provide administration computing device 126 the vehicle crash data. In some embodiments, remote computing device 116 may automatically send the vehicle crash data to administration computing device 126. Administration computing device 126 may transmit additional crash information collected from the vehicle crash and victims to remote computing device 116 to be stored, and/or subsequently analyzed or transmitted to additional computing devices. In some embodiments, administration computing device 126 may send stored vehicle crash data from second data communication 404 to remote computing device to locate and/or verify a matching vehicle crash data entry. Administration computing device 126 may also edit the vehicle crash data in remote computing device 116 to correct errors and inconsistencies.

Fourth data communication 408 may be a data communication between remote computing device 116 and each insurance computing device 124 and/or user device 125. As described above, if the vehicle crash data includes any vehicle identifiers, remote computing device 116 may identify the associated insurance provider with each vehicle of the vehicle crash. Remote computing device 116 may transmit the vehicle crash data to insurance computing device 124 of the associated insurance provider using fourth data communication 408. If the vehicle crash data does not include vehicle identifier, remote computing device 116 may notify insurance computing devices 124 of any new vehicle crash data using limited vehicle crash data, such as time, date, location, and an image of the vehicle crash, and/or data associated with the severity vehicle damage and/or passenger injuries. In the exemplary embodiment, insurance computing devices 124 may be notified by an insurance claim filed by the victim of the vehicle insured by the associated insurance providers 124. Insurance providers 124 and/or user device 125 may send a search or download request to remote computing device 116 to locate and retrieve the vehicle crash data.

The vehicle crash data stored in remote computing device 116 may be deleted after the vehicle crash data is sent to insurance computing devices 124. For example, the vehicle crash data may be deleted immediately upon receipt, after a time duration expires, or manually. In the exemplary embodiment, the associated insurance provider 124 may subscribe to the vehicle crash data stored in remote computing device 116 to receive updated information (e.g., edits and additional crash information submitted by administration device 126) and/or notifications of other insurance providers 124 involved in the vehicle crash.

V. EXEMPLARY COMPUTER-IMPLEMENTED METHOD FOR COLLECTING VEHICLE CRASH DATA

Figure 5:
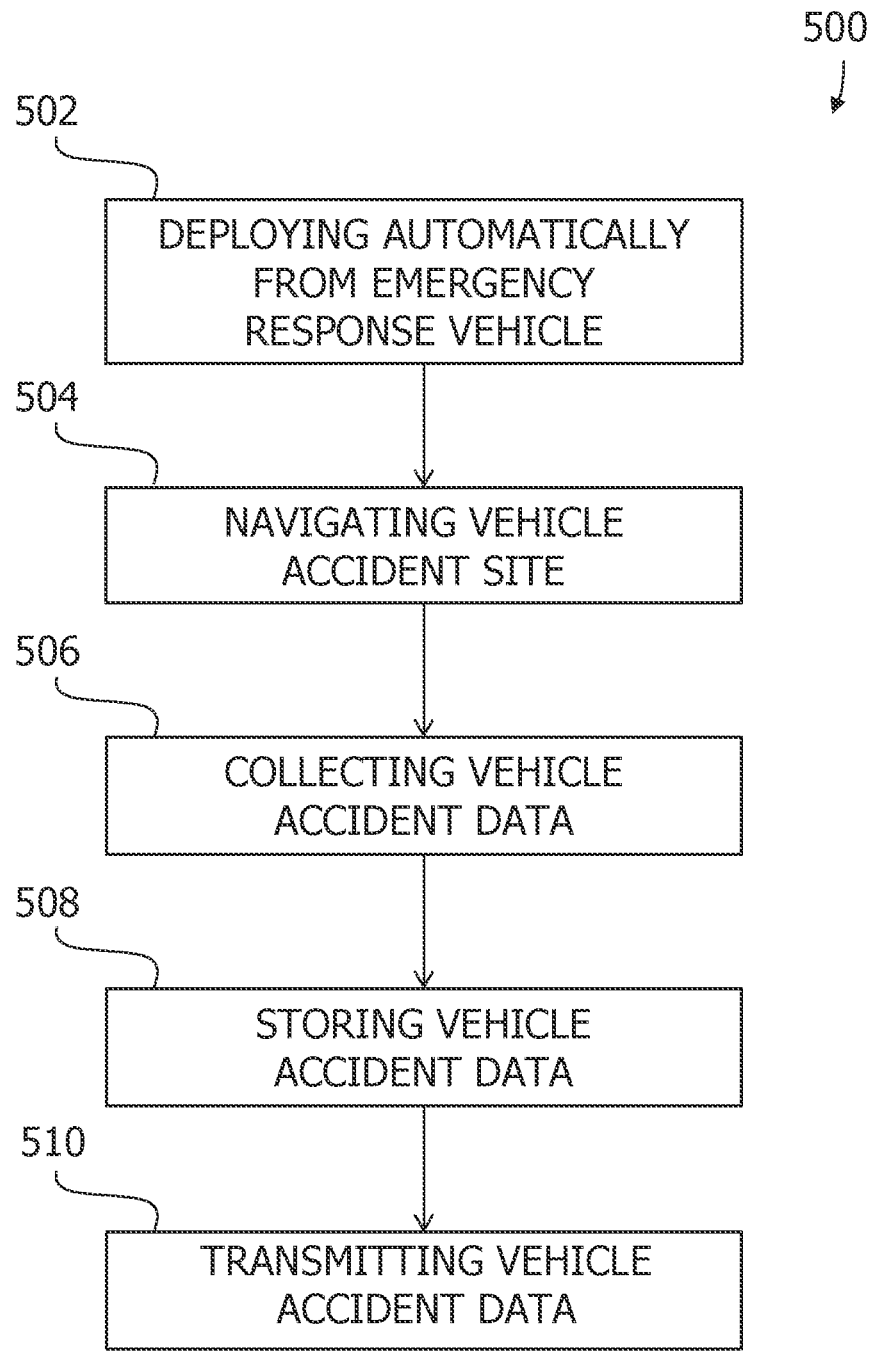
FIG. 5 illustrates an exemplary computer-implemented method for collecting data at a vehicle crash site, where the exemplary method may be implemented by a vehicle crash data collection system, such as the system shown in FIG. 1.

FIG. 5 illustrates an exemplary computer-implemented method 500 for a UAV, or drone, in a vehicle crash data collection system. Method 500 may be implemented by a vehicle crash data collection system, such as system 100 shown in FIG. 1. In the exemplary embodiment, method 500 may be implemented by a UAV. Method 500 may include additional, fewer, or alternate actions, including those discussed elsewhere herein, and/or may be implemented via various local or remote processors, and/or computer-executable instructions stored on non-transitory computer-readable media or medium.

Method 500 may begin with the UAV coupled to an emergency response vehicle at a vehicle crash scene of a vehicle crash. The UAV may automatically deploy 502 from the emergency response vehicle. In the exemplary embodiment, the UAV may be configured for aerial deployment. The UAV may navigate 504 a vehicle crash site and/or around the vehicle crash. In the exemplary embodiment, the UAV may automatically maneuver around the vehicle crash site to facilitate vehicle crash data collection. The UAV may collect 506 vehicle crash data with at least one sensor while navigating 504 the vehicle crash site.

The UAV may store 508 the collected vehicle crash data for further transmission. In some embodiments, the UAV may process the vehicle crash data. For example, the UAV may detect if the vehicle crash data includes any vehicle identifiers using pattern recognition on image data of the vehicle crash data. Additionally or alternatively, the UAV may not store 508 the vehicle crash data. The UAV may transmit 510 the vehicle crash data to at least one computing device for further processing. In the exemplary embodiment, the UAV may transmit 510 the vehicle crash data to a remote computing device and/or an administration computing device. In some embodiments, the UAV may transmit 510 the vehicle crash data to at least one insurance computing device (such as an insurance provider remote server), and/or at least one user device (such as a user mobile device, e.g., smartphone).

VI. EXEMPLARY COMPUTER-IMPLEMENTED METHOD FOR PROCESSING VEHICLE CRASH DATA

Figure 6:
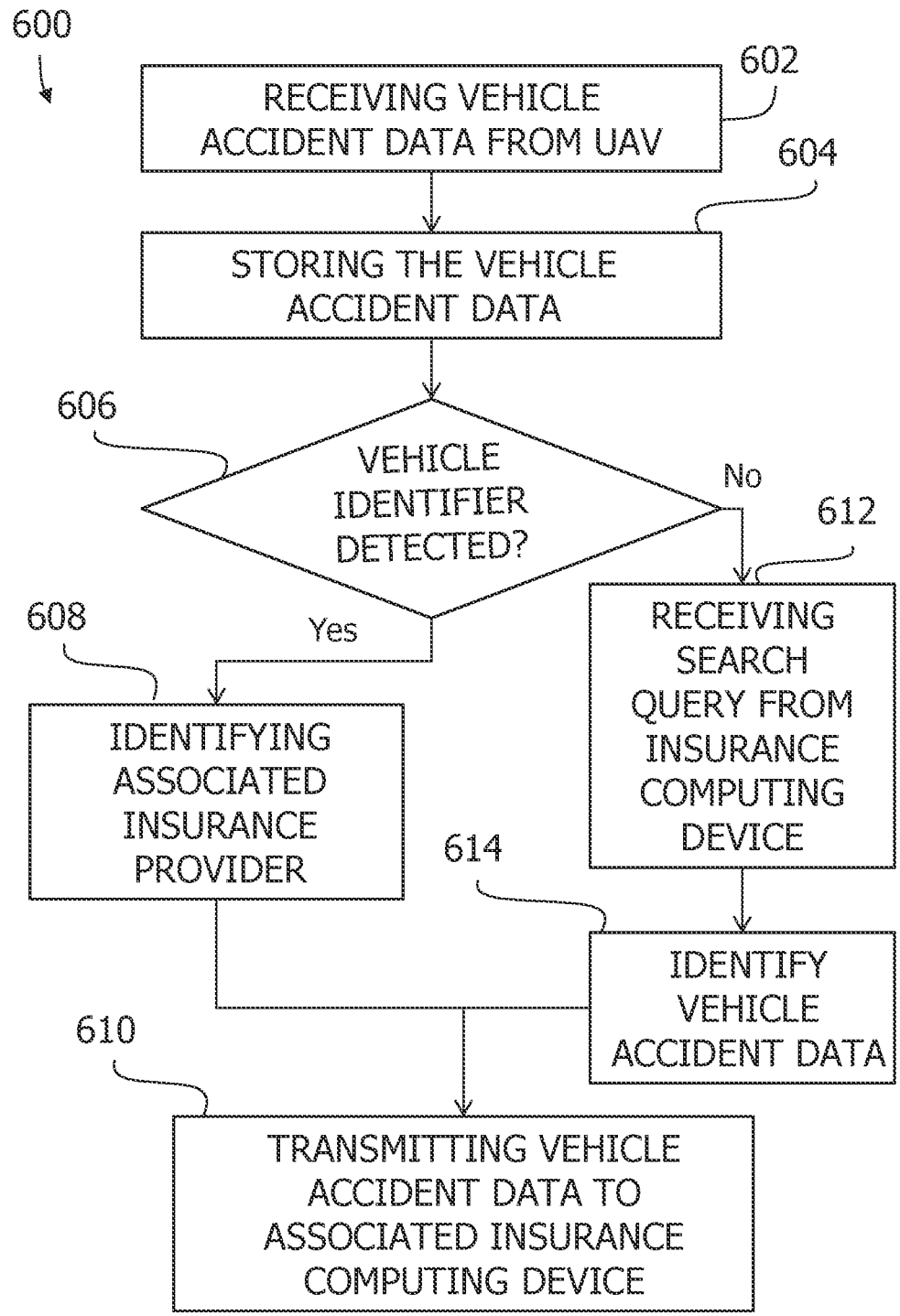
FIG. 6 illustrates an exemplary computer-implemented method for processing vehicle crash data collected at a vehicle crash site, where the exemplary method may be implemented by a vehicle crash data collection system, such as the system shown in FIG. 1.

FIG. 6 depicts an exemplary computer-implemented method 600 of processing vehicle crash data from a vehicle crash. Method 600 may be implemented by a vehicle crash data collection system including at least a UAV with at least one sensor and a remote computing device, such as system 100 shown in FIG. 1. In some embodiments, method 600 may be implemented, at least in part, by an insurance computing device. Method 600 may include additional, fewer, or alternate actions, including those discussed elsewhere herein, and/or may be implemented via various local or remote processors, and/or computer-executable instructions stored on non-transitory computer-readable media or medium.

Method 600 may begin with the remote computing device receiving 602 vehicle crash data from the UAV. The remote computing device may store 604 the vehicle crash data. In certain embodiments, the remote computing device may scan the vehicle crash data. The remote computing device may determine 606 if the vehicle crash data includes any vehicle identifiers.

If a vehicle identifier is detected, the remote computing device may identify 608 an associated insurance provider based, at least in part, on the vehicle identifier. In some embodiments, the remote computing device may compare the vehicle identifier to a lookup table including at least vehicle identifiers and/or associated insurance providers. The lookup table may further include vehicle owners and insurance policy holders. The remote computing device may transmit 610 the vehicle crash data to the associated insurance provider. In the exemplary embodiment, the remote computing device may transmit 610 the vehicle crash data to an insurance computing device implemented by the associated insurance provider. In the embodiments in which the vehicle crash data includes a plurality of vehicle identifiers, the remote computing device may continue to identify 608 an associated insurance provider and transmit 608 the vehicle crash data to the associated insurance provider until no more vehicle identifiers remain. In some embodiments, at least one of the vehicle identifiers may not identify an associated insurance provider and may be disregarded or identified separately from the other vehicle identifiers.

If the remote computing device determines 606 that the vehicle crash data does not include any vehicle identifiers, the remote computing device may receive 612 a search query from a first insurance provider via a first insurance computing device. In some embodiments, the search query may be sent by an insurance policy holder or vehicle owner via a user device. Alternatively, the remote computing device may transmit a notification including at least a portion of the vehicle crash data to at least one insurance computing device.

The remote computing device may identify 614 the vehicle crash data based, at least in part, on the search query to determine the first insurance provider is associated with a vehicle at the vehicle crash site. In the exemplary embodiment, the remote computing device may compare the search query to any stored vehicle crash data and, determine if any stored vehicle crash data matches or corresponds to the search query. In some embodiments, the remote computing device may send search results to the first insurance computing device. In response, if the first insurance provider determines the search results include the vehicle crash data associated with the vehicle, the insurance computing device may send a download request to the remote computing device for the identified vehicle crash data. Additionally or alternatively, the remote computing device may automatically identify 614 the vehicle crash. In some embodiments, the remote computing device may not identify 614 any vehicle crash data based upon the search query and may send a notification to the insurance provider in response. The remote computing device may transmit 610 the vehicle crash data to the associated insurance provider via the insurance computing device.

VII. EXEMPLARY COMPUTER-IMPLEMENTED METHOD FOR INITIATING AN INSURANCE CLAIM WITH CRASH DATA

Figure 7:
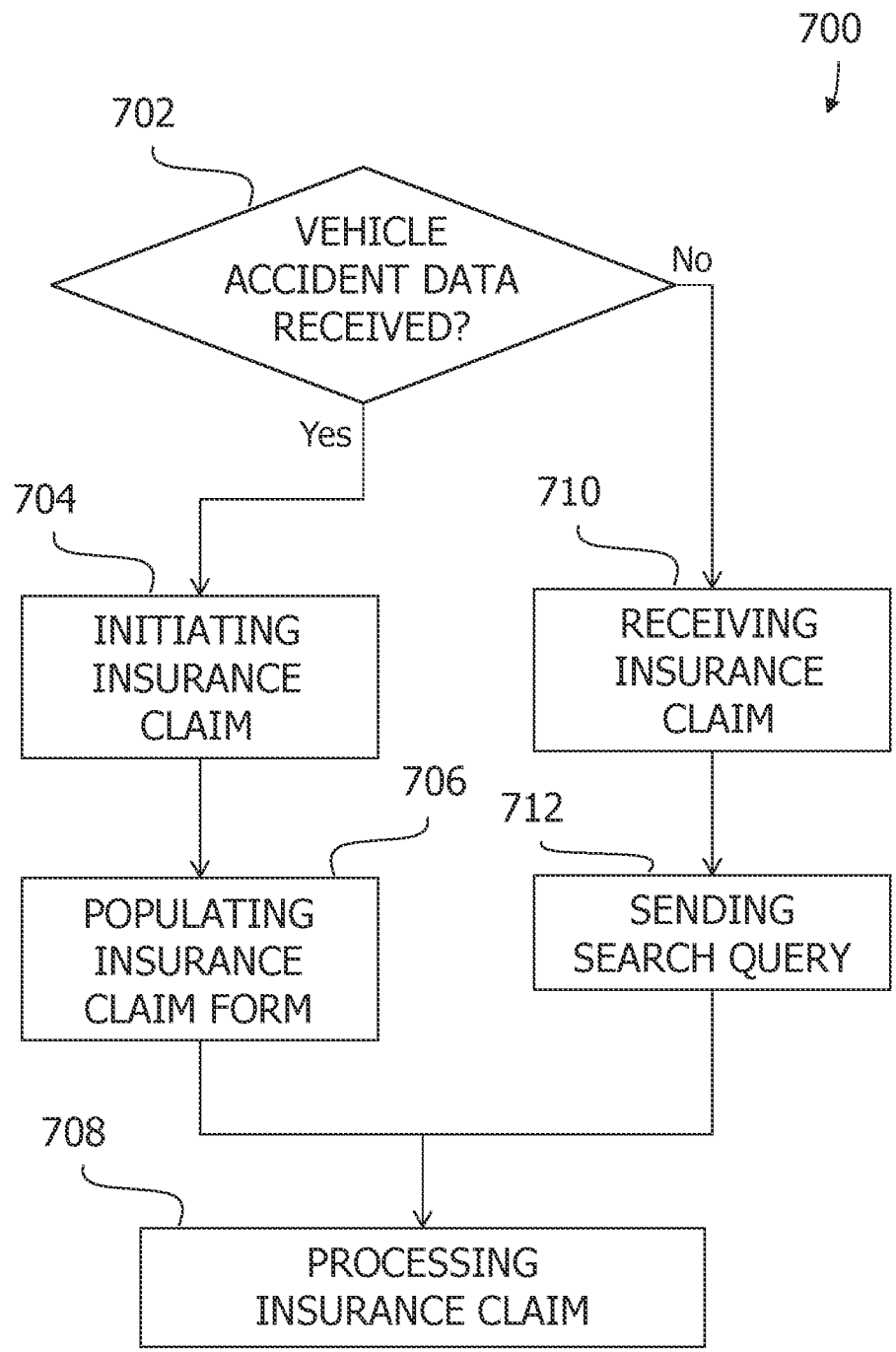
FIG. 7 illustrates an exemplary computer-implemented method for initiating an insurance claim process with vehicle crash data collected from a vehicle crash site, where the exemplary method may be implemented by a vehicle crash data collection system, such as the system shown in FIG. 1.

FIG. 7 depicts an exemplary computer-implemented method 700 of processing vehicle crash data from a vehicle crash with an insurance computing device. Method 700 may be implemented by a vehicle crash data collection system such as system 100 shown in FIG. 1. Method 700 may include additional, fewer, or alternate actions, including those discussed elsewhere herein, and/or may be implemented via various local or remote processors, and/or computer-executable instructions stored on non-transitory computer-readable media or medium.

Method 700 may begin with the insurance computing device determining 702 if any vehicle crash data involving an associated vehicle or insurance policy holder has been received from a remote computing device. If the insurance computing device has received vehicle crash data from the remote computing device, the insurance computing device may initiate 704 a crash insurance claim for the insurance policy holder or vehicle owner. In the exemplary embodiment, the insurance computing device may notify the insurance policy holder via a user device that the crash insurance claim has been initiated. In some embodiments, the insurance computing device may notify the insurance policy holder before initiating 704 the crash insurance claim and may wait for the insurance policy holder to consent to the claim. The insurance computing device may automatically populate 706 an insurance claim form based, at least in part, on the vehicle crash data and process 708 the crash insurance claim. In some embodiments, the vehicle crash data may be used to assess fault of the crash.

If the insurance computing device determines 702 that no vehicle crash data has been received from the remote computing device, the insurance computing device may wait until receiving 710 a crash insurance claim from the insurance policy holder. Based upon the information in the crash insurance claim, the insurance computing device may send 712 a search query to the remote computing device to identify any matching vehicle crash data. The insurance computing device may receive the vehicle crash data from the remote computing device if the vehicle crash data is identified. If the vehicle crash data is not identified, the insurance computing device may use the crash insurance claim and other data such as Police Accident Records to initiate the insurance claim. The insurance computing device may proceed to process 708 the crash insurance claim.

In one embodiment, the method (and/or computer system) may include using the vehicle crash data received to create or identify vehicle identifiers and facilitate insurance services. For instance, the method and computer system may include facilitating treatment of a damaged vehicle by gathering crash information, estimating an extent of vehicle damage, and transmitting information associated with treating the damaged vehicle, such as in the manner described by U.S. patent application Ser. No. 14/841,222 (entitled "System and Method for Using a Specialty Vehicle Data Identifier to Facilitate Treatment of a Vehicle Damaged in a Crash," filed Aug. 31, 2015). The method and computer system may include providing vehicle insurance services and providing a specialty vehicle data identifier template for facilitating translation of a vehicle data identifier used to identify a vehicle, such as in a manner described by U.S. patent application Ser. No. 14/841,200 (entitled "System and Method for Facilitating Vehicle Insurance Services," filed Aug. 31, 2015). The method and computer system may include providing vehicle insurance services that include correlating vehicle information with a specialty vehicle data identifier, such as in a manner described by U.S. patent application Ser. No. 14/841,179 (entitled "Vehicle Treatment—Big Data," filed Aug. 31, 2015). The three forementioned U.S. patent applications are hereby incorporated by reference in their entireties.

VIII. EXEMPLARY SERVER DEVICE

Figure 8:
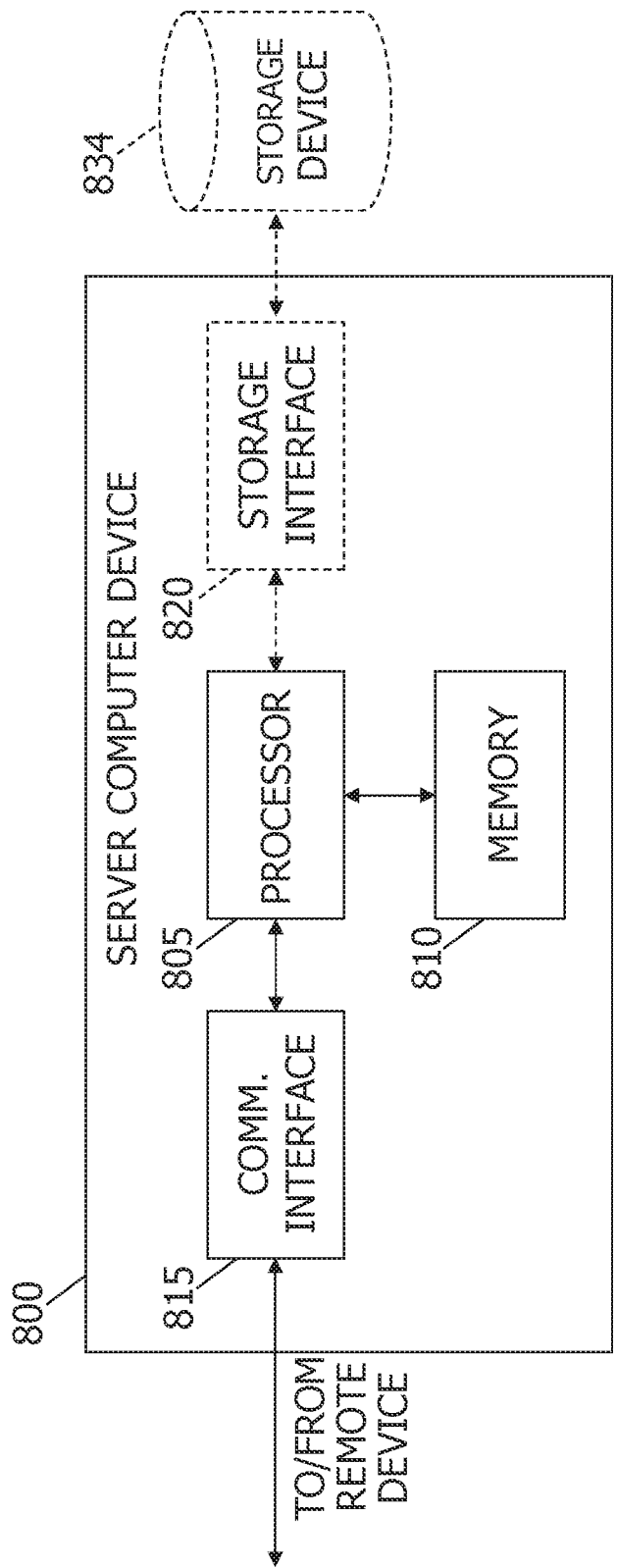
FIG. 8 illustrates an exemplary server computer device that may be used in a vehicle crash collection system, such as the system shown in FIG. 1.

FIG. 8 depicts an exemplary configuration of an exemplary server computer device 800 that may be used in a vehicle crash data collection system, such as system 100 shown in FIG. 1, in accordance with one embodiment of the present disclosure. A server computer device 800 may include, but is not limited to, remote computing device 116, insurance computing devices 124, user device 125, or administration computing device 126 (all shown in FIG. 1). Server computer device 800 may also include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 800 may be capable of communicating with a remote device such as another server computer device 800, UAV 106 (shown in FIG. 1), insurance computing devices 124, user device 125, and/or administration computing device 126. For example, communication interface 815 may receive requests from or transmit requests to UAV 106 via the Internet.

Processor 805 may also be operatively coupled to a storage device 834. Storage device 834 may be any computer-operated hardware suitable for storing and/or retrieving data, such as, but not limited to, data associated with remote computing device 116, insurance computing devices 124, and/or administration computing device 126. In some embodiments, storage device 834 may be integrated in server computer device 800. For example, server computer device 800 may include one or more hard disk drives as storage device 834. In other embodiments, storage device 834 may be external to server computer device 800 and may be accessed by a plurality of server computer devices 800. For example, storage device 834 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 834 via a storage interface 820. Storage interface 820 may be any component capable of providing processor 805 with access to storage device 834. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 834.

Processor 805 executes computer-executable instructions for implementing aspects of the disclosure. In some embodiments, processor 805 may be transformed into a special purpose microprocessor by executing computer-executable instructions or by otherwise being programmed. For example, processor 805 may be programmed with the instructions such as are illustrated in FIG. 6.

IX. ADDITIONAL AUTONOMOUS DRONE EMBODIMENTS

The present embodiments may relate to a computer-implemented method to effect the collection of real-time vehicle (or other crash) data. An UAV, such as autonomous or semi-autonomous drone, may be placed on the top of a fire engine or other emergency response vehicle. When the EMS vehicle arrives on the crash scene, the UAV may automatically disengage from the roof and fly over the crash site capturing critical information, such as the exact location of the vehicle(s) involved and their location relative to nearby infrastructure.

For instance, as shown in FIGS. 2 and 3, an autonomous or semi-autonomous drone may launch from an initial emergency response vehicle arriving at the scene. The autonomous or semi-autonomous drone may be programmed to fly a preset pattern over the event/crash scene. The autonomous or semi-autonomous drone may capture/generate data and/or imagery from the scene. The autonomous or semi-autonomous drone may process the data collected and/or generated, and report back to the emergency responders (such as via mobile device), emergency vehicle controllers/processors, and/or third party remote servers or processors (such as located at an insurance provider or hospital).

With conventional techniques, when a crash occurs, a first responder may be tasked with rescuing and caring for injured people, directing traffic and ensuring that the scene is safe (e.g., washing down the road). These activities are critical and do not leave time for these responders to gather data, data which may prove short-lived once the damaged vehicles are removed and the road is reopened. Additionally, the gathering of this data must not interfere with emergency response activities.

The present embodiments may involve placing UAVs on the tops of fire and emergency response vehicles. When the EMS vehicle arrives on scene, the UAV automatically disengages from the roof and flies over the crash site capturing critical information; such as the exact location of the vehicles involved and their location relative to the infrastructure. These units (in time) may be able to fly without a human interface (e.g., autonomously), and since they may fly, they may be safely gathering data from above and out of the way of the EMS team as it does its work. The data gathered may include, but is not limited to: (1) the exact location of the vehicles involved; (2) the location of the vehicles relative to the infrastructure (curb, centerline, bridge, power pole, etc.); (3) the number and type of vehicles involved; (4) the location and extent of debris from the crash; (5) the vehicle license plates of vehicle involved; (6) whether any vehicle involved sustained damage consistent with a total loss, or is going to have to be towed away from the crash scene; (7) locations of victims (thermal camera), especially if they were ejected any distance away; (8) the extent of any injuries and/or whether an ambulance is needed; (9) identification of hazardous materials involved in the event (an algorithm may key in on visible HAZMAT placards); and/or other types of data, including that discussed elsewhere herein.

Some of the drone-collected information may prove useful to EMS, such as where people are located and may be communicated through an interface created to allow the emergency responders to monitor the UAV data (onsite or remotely). Since the vehicle may launch upon arrival at the scene (or shortly before or after arrival), it may also quickly broadcast images back to a command post (which may be used for crashes involving vehicles carrying hazardous materials). And communicate the scale of the crash (such as smoke, fog, or snow storm involving a multicar pileup). Thermal imaging could "see" residual warmth from each car/truck engine to "count" the number of involved vehicles, and injured persons. This information may let EMS know in a timely manner if they need to bring in more assistance.

Once the data is gathered by the drone, it may be used to pre-populate the Police Accident Record (PAR). It may also be transmitted to the vehicles' insurance companies to accelerate the claim handling process, such as after license plate is read and/or the vehicle otherwise identified from drone data. By remotely collecting data with sophisticated sensors, the dimensions, precise locations and/or relative positions may be very accurate. It may also, after being checked by the police officer responsible for the event, prove to be a real time saving technology. The collection of data via autonomous or semi-autonomous drones may also be safer than having law enforcement measuring and marking things manually after a crash. And if the methods herein speed things up, the traffic wait for backup cars and trucks may be less, and in turn may lead to less additional crashes.

In one embodiment, remote automatic deployment of a UAV may be provided, and the UAV may be interfaced with EMS, local law enforcement, insurance providers, such as via wireless communication and data transmission. The remote data collection may enable real-time decision making for response to an event.

As noted herein, the present embodiments may relate to collecting data associated with an insurance-related event such as an automobile crash via a drone associated with an emergency response vehicle. Although the insurance-related event is described elsewhere herein as an automobile or vehicle crash, it is contemplated that the present embodiments may also apply to other insurance-related events, such as, but not limited to, train derailment, airplane crash, or home (or other building or structure) fire. The drone may be fully autonomous, semi-autonomous, or manually operated. The drone data that is collected by the drone may be locally stored on a memory unit mounted on the drone, and/or transmitted to an insurance provider, or other third party, remote server or processor, for remote storage and/or subsequent analysis.

Computer analysis of the drone data may facilitate, or be used to, (i) handle, adjust, or generate insurance claims (such as an auto, homeowners, renters, or personal articles insurance claim); (ii) make the process of repairing damaged vehicles and homes (or other buildings or structures) more efficient and timely; (iii) reconstruct crash scenes; (iv) determine fault, wholly or partially, for a crash, such as vehicle, operator, weather-related, or construction-related fault; (v) identify buildup (i.e., fraudulent inflation of a potential insurance claim) or fraudulent insurance claims; and/or other insurance-related purposes or activities.

In one aspect, a drone may be securely mounted to an emergency response vehicle, such as held in place as the vehicle travels to the scene of a crash by one or more processor controller latches (such as electronically-controlled latches, which may be controlled or released by one or more electronically controlled servos or actuators). The emergency response vehicle may include a vehicle controller or processor that receives a location, such as a street location or GPS location, of a crash scene. Once the emergency response vehicle arrives at, or within the vicinity of, the street location or GPS location (such as within 10, 25, or 50 meters of the crash location), and/or after the vehicle is safely parked, the vehicle controller or processor may (a) automatically unlatch the drone, (b) start the drone, and/or (c) direct liftoff and movement of the drone, either in a fully autonomous mode or a semi-autonomous mode of operation. For instance, a driver of the emergency vehicle may flip an electronic switch releasing the drone and/or starting the drone once the emergency vehicle arrives at the scene of the crash, and/or is safely parked. The drone may be securely mounted to a roof of emergency vehicle, such as an ambulance, police vehicle, or fire engine in some embodiments to facilitate quick and automatic, or semi-automatic, deployment in the face of an emergency situation or vehicle crash—when time may be of the essence to give emergency aid to those injured. Additionally or alternatively, the drone may be under full control of a local or remote operator once it is launched from the emergency vehicle at, or near the scene of, the crash.

The date collected by the drone of the crash, such as an auto or train crash, building or structure fire, or natural disaster (e.g., earthquake, wildfire, hurricane, tornado, flash flooding, storm surge, or other catastrophe) may be analyzed to determine a severity of damage to vehicles, buildings or homes, and/or people (such as damage to insured autos or homes/buildings/structures, and/or injuries to insured drivers, passengers, or homeowners). The drone data may be analyzed using object recognition (OR), optical character recognition (OCR), or other computing techniques, via one or more local or remote processors (such as drone mounted processors, or remotely located EMS, emergency vehicle, and/or insurance provider servers or processors). For instance, vehicle features, such as color, make, type of vehicle (e.g., sedan or SUV), VIN, license plate number and State, etc., may be identified, such as using OR and/or OCR techniques performed on the drone data collected.

While the emergency response vehicle travels to the scene of the crash, GPS location data associated with a GPS location or street address of the crash (such as the corner of Elm and Chippewa Streets for a vehicle crash, or 305 Elm St. for a home fire or other crash) may be downloaded from the internet, a website, or a server, or retrieved from an onboard memory unit. The GPS location data associated with the crash scene may be used to automatically generate an initial flight plan for the drone (to be used once the drone arrives onsite of the crash, such as used by an autonomous or semi-autonomous drone to fly around the crash scene and collect/generate crash data). The initial flight plan may be pre-programmed to, or otherwise stored, onto a drone memory unit.

Prior to launch, or even after launch, at the crash scene, the flight path of the drone may be adjusted to take into account obstacles and/or the extent of the crash. For instance, a train crash scene may extend for a mile or two. The pre-generated flight path generated based upon an initial location reported may be adjusted manually or automatically once at the crash scene to account for the actual extent of the crash scene which may not have been previously reported and/or which may have changed after the initial report. For instance, a (remote or local) manual operator may take control of the drone, partially or wholly. Alternatively, a (remote or local) operator may adjust the flight path, such as entering into a computer GPS coordinates, or street names, detailing the extent (or defining the boundaries) of the crash.

Further, additionally or alternatively, once the drone is airborne at the scene, the drone may analyze the extent of the crash in real-time or near real-time, and (i) generate an original flight path from the drone data being collected, and/or (ii) adjust the original pre-programmed flight path uploaded to the drone based upon the analysis of the drone data being collected in real-time or near real-time. For instance, GPS coordinates associated with the drone data being collected may be compared with GPS coordinates of the original pre-programmed flight path, and the original pre-programmed flight path may then be adjusted to account for GPS or other errors. Also, any flight path pre-generated may have associated GPS coordinates that may be periodically or constantly compared with GPS data being generated from the drone in real-time to detect any errors with the flight path, and/or mismatches between actual or current drone GPS or other location data with an expected drone location—such as based upon map-matching, dead reckoning, or other techniques used to ensure that the drone is actually at its expected position (and not off by a few meters, which may make the drone collide with objects or obstacles in a flight path). Moreover, if the crash occurs at night, or without sunlight, the drone may deploy or energize a spot light to help emergency responders find those injured, determine an extent of damage, and/or to facilitate generating image or video data of enhanced quality at the crash scene.

In one aspect, an autonomous or semi-autonomous drone released at a crash scene may be programmed to identify obstacles (such as obstacles that have moved because of the crash, e.g., street light or sign now hanging over the middle of a street) and/or their locations, compare the obstacles height or location with a pre-programmed flight path, and/or adjust the flight path to automatically avoid the obstacles or otherwise fly the autonomous or semi-autonomous drone in a safe and automatic manner.

In another aspect, the autonomous or semi-autonomous drone may be controlled or moved in an incremental manner, such as during a close inspection of an insured property/object. A control module may stabilize the drone in a consistent hover while maintaining a close distance. The control module of the drone may retrieve proximal sensor data that indicates possible nearby obstructions to the drone. The control module may automatically adjust the flight path of autonomous drone. Additionally or alternatively, the control module may transmit the sensor data to a remote server—that in turn determines, and displays to a remote operator, the non-obstructed directions that the drone is capable of moving. A remotely controlled drone (controlled via a manual operator) may be controlled in a manner disclosed by U.S. Pat. No. 8,818,572, entitled "System and Method for Controlling a Remote Aerial Device for Up-Close Inspection, the entirety of which is hereby incorporated by reference herein in its entirety.

In another embodiment, an autonomous, semi-autonomous, or manually operated drone may be used in conjunction with a tethering device at the crash scene. The tethering device may utilize a ground line attached to the drone in such a way that the line can flex to avoid obstacles. An exemplary tethering device is disclosed by U.S. Pat. No. 8,931,144, entitled "Tethering System and Method for Remote Device," which is hereby incorporated by reference herein in its entirety.

X. EXEMPLARY METHOD DEPLOYING AUTONOMOUS DRONES

In one aspect, a computer-implemented method of collecting autonomous, semi-autonomous, and/or other drone data for insurance-related purposes may be provided. The method may include: (1) receiving, via or at one or more processors (such as via wireless communication and/or data transmission at an associated transceiver, the processors being associated with an autonomous, semi-autonomous, or manually operated drone; emergency response vehicle; insurance provider; or other third party, such as a hospital, police department, or fire department), a crash location (such as a GPS location or street address) associated with an insurance-related event, such as a vehicle crash, train or plane crash, house fire, earthquake, tornado, hurricane, or natural disaster; (2) generating, at the one or more processors (or other processor), a pre-generated flight path for an autonomous or semi-autonomous drone based upon the crash location (such as determine a length and/or width of the crash scene, or a radius around the crash location (such as 25, 50, or 100 meters, or other radius distance)), the autonomous or semi-autonomous drone being mounted, or held securely in place, on an emergency response vehicle traveling to the crash location; (3) uploading, via the one or more processors (or other processor), the pre-generated flight path to the autonomous or semi-autonomous drone; (4) once the emergency response vehicle arrives at the crash scene, autonomously or semi-autonomously flying (such as under the direction and/or control of one or more drone-mounted, emergency response vehicle, insurance provider, emergency responder, or third party processors) the autonomous or semi-autonomous drone in accordance with the pre-generated flight path at the crash location to generate and/or collect drone data (e.g., image, video, or audio data) associated with the crash; (5) generating and/or collecting crash scene or drone data, via one or more drone or other processors (or other processor), while the drone is using, operating via, or flying the pre-generated flight path, or a portion thereof; (6) receiving, via or at one or more processors (such as at an insurance provider, emergency responder, or other third party remote server or processor), the crash scene or drone data transmitted from the drone (such as transmitted from a drone or emergency response vehicle transceiver); (7) analyzing, via the one or more processors (such as an autonomous or semi-autonomous drone, emergency response vehicle, insurance provider, emergency responder, or other third party remote server or processor), the crash scene or drone data received (or otherwise stored at the drone or in an autonomous or semi-autonomous drone memory); (8) determining, via the one or more processors (such as an autonomous or semi-autonomous drone, emergency response vehicle, insurance provider, emergency responder, or other third party remote server or processor), an extent of vehicle or home (or other building or structure) damage caused by the insurance-related event from computer analysis of the crash scene or drone data (such as via comparison with historical images of previous vehicle crashes or insurance-events/emergencies, images of insured assets (vehicles, homes, buildings, structures, etc.) with a predetermined estimate of damage or estimate of severity of the event stored in a memory unit or database); and/or (9) using, via the one or more processors (such as an autonomous or semi-autonomous drone, emergency response vehicle, an insurance provider, emergency responder, or other third party remote server or processor), the extent of vehicle or home (or other building or structure) damage determined from computer analysis of the crash scene or drone data to facilitate mitigating or preventing further damage and/or for further insurance-related purposes. The method may include additional, less, or alternate actions, including those discussed elsewhere herein, and/or may be implemented via one or more local or remote processors (e.g., drone, emergency vehicle, or insurance provider processors), or via computer-executable instructions stored in a non-transitory computer readable medium or media.

For instance, the method may include using or otherwise analyzing, via the one or more processors, the extent of vehicle or home (or other building or structure) damage determined from computer analysis of the crash scene or drone data to handle, adjust, and/or generate an insurance claim for the insured, such as an auto insurance claim, or a homeowners, renters, or personal articles insurance claim. The method may include using or otherwise analyzing, via the one or more processors, the extent of vehicle or home (or other building or structure) damage determined from computer analysis of the crash scene or drone data to request additional emergency responders promptly respond to the scene of the crash, such as via wireless communication and/or data transmission.

The method may include using or otherwise analyzing, via the one or more processors, the extent of vehicle or building damage determined from computer analysis of the crash scene or drone data to estimate an amount of vehicle or building damage, and/or make recommendations to the insured to facilitate promptly repairing the vehicle or building damage, such as generating recommendations regarding one or more reputable local vehicle or building repair companies which are then transmitted to a mobile device of the insured for their review or approval. In certain embodiments, the method may generate a recommendation of a towing service provider. The method may include using or otherwise analyzing, via the one or more processors, the crash scene or drone data to identify potential buildup or otherwise adjust insurance claims upward or downward.

The method may include using or otherwise analyzing, via the one or more processors, the crash scene or drone data to virtually reconstruct the crash scene, such as including before, during, and/or after events, and/or determine fault for the crash, such as assign partial or whole fault for the crash to one or more participants or vehicles (such as autonomous vehicles), or weather or construction conditions.

The method may include (i) determining, via one or more local or remote processors, (a) the emergency vehicle has arrived at, or within the vicinity of the crash location (such as within 100 meters), and/or (b) has stopped moving or is otherwise parked; (ii) once the emergency vehicle is at the crash location, via one or more processors, automatically releasing or otherwise opening one or more vehicle-mounted latches holding the autonomous or semi-autonomous drone in place on (such as on the roof of an emergency response vehicle), or otherwise securing the drone to, the emergency response vehicle; and/or (iii) directing, via one or more processors, and/or under local or remote operator control, the autonomous or semi-autonomous drone to liftoff and/or fly around the crash location and/or gather/collect crash scene data that may be used for insurance-related purposes.

The method may include (i) once the autonomous or semi-autonomous drone is airborne at the crash scene, determining, via one or more local or remote processors, one or more obstacles in a pre-generated or other flight path of the autonomous or semi-autonomous drone, such as from computer analysis of the drone data initially collected at the crash scene; and/or (ii) automatically or manually directing or adjusting, via one or more processors, the flight path of the autonomous or semi-autonomous drone at the crash scene to avoid the one or more obstacles detected via computer analysis of the recently gathered drone data (such as to detect current obstacles not presently stored in dated or old GPS or other location data stored in a memory unit).

XI. EXEMPLARY METHOD OF USING AUTONOMOUS DRONES

In one aspect, a computer-implemented method collecting an autonomous or semi-autonomous drone data for insurance-related purposes may be provided. The method may include (1) receiving, via or at one or more processors (such as via wireless communication and/or data transmission at an associated transceiver, the processors being associated with an autonomous or semi-autonomous drone, an emergency vehicle, an insurance provider, or other third party, such as a hospital, police department, or fire department), a crash location (such as a GPS location or street address) associated with an insurance-related event, such as a vehicle crash, train or plane crash, house fire, earthquake, tornado, hurricane, or other catastrophe.

The method may include (2) generating, at the one or more processors (or other processor), a pre-generated flight path for an autonomous or semi-autonomous drone based upon the crash GPS location (such as determining a length and/or width of the crash scene, or a radius around the crash location (such as 25 or 100 meters)), the autonomous or semi-autonomous drone being mounted, or held securely in place, on an emergency response vehicle traveling to the crash location. For instance, for a vehicle crash, based upon a GPS location along a road or highway, a circular flight path may be determined with a radius of 10-50 meters centered around the crash GPS location. For a home (or building or structure) fire, a flight path may be generated around a home at a certain distance from each side of the home, such as flight path directing the drone to fly 2-5 meters from each wall of a partially damaged house. The flight paths may include varying the distance from a damaged insured asset (e.g., vehicle or building) to enhance the quality of images acquired, such as moving the drone closer to a damaged vehicle, and then moving further away to acquire images of different viewpoints of the event.

The method may include (3) uploading, via the one or more processors (or other processor), the pre-generated flight path to the autonomous or semi-autonomous drone, or memory unit thereof. For instance, a drone may be upload with a pre-generated flight path that centered around a GPS crash location. Alternatively, the drone may receive the crash GPS location and generate a flight path that moves along the road a certain distance, for a vehicle crash, or flies around the crash GPS location at a certain or varying distance, such as 5-25 meters from the crash scene.

The method may include (4) once the emergency response vehicle arrives at the crash scene, autonomously or semi-autonomously (e.g., the drone is at least partially controlled by one or more autonomous or semi-autonomous drone, insurance provider, emergency responder, emergency response vehicle, third party processors, and/or a local or remote drone operator) flying the autonomous or semi-autonomous drone in accordance with the pre-generated flight path at the crash location to collect drone data (e.g., image, video, or audio data) associated with the crash to facilitate using the drone data for insurance-related activity. The method may include additional, less, or alternate actions, including those discussed elsewhere herein, and/or may be implemented via one or more local or remote processors (e.g., drone, emergency vehicle, or insurance provider processors), or via computer-executable instructions stored in a non-transitory computer readable medium or media.

For instance, the method may include collecting crash scene or drone data, via one or more autonomous or semi-autonomous drone or other processors (or other processor), while the autonomous or semi-autonomous drone is flying, otherwise operating via, the pre-generated flight path. The method may include receiving, via one or more processors (such as at an insurance provider, emergency responder or vehicle, or other third party remote server or processor), the crash scene or drone data transmitted from the autonomous or semi-autonomous drone (such as transmitted from a transceiver mounted on the autonomous or semi-autonomous drone); and/or storing, via the one or more processors, the crash scene or drone data in a memory unit for subsequent analysis.

The method may include (i) analyzing, via the one or more processors (such as an autonomous or semi-autonomous drone, an insurance provider, emergency responder or vehicle, or other third party remote server or processor), the crash scene or drone data received (or otherwise stored at the drone or in a drone memory); (ii) determining, via the one or more processors (such as an autonomous or semi-autonomous drone, an insurance provider, emergency responder or vehicle, or other third party remote server or processor), an extent of vehicle or building damage caused by the insurance-related event from computer analysis of the crash scene or drone data (such as via comparison with historical images of previous vehicle crashes or insurance-events/emergencies stored in a memory unit or database); and/or (iii) using, via the one or more processors (such as an autonomous or semi-autonomous drone, an insurance provider, emergency responder, or other third party remote server or processor), the extent of vehicle or building damage determined from computer analysis of the crash scene or drone data to mitigate further damage and/or for further insurance-related purposes.

The insurance-related activity may include (a) using or otherwise analyzing, via the one or more processors, the crash scene or drone data to handle, adjust, and/or generate an insurance claim for the insured, such as an auto insurance claim, or a homeowners or renters insurance claim; (b) using or otherwise analyzing, via the one or more processors, the crash scene or drone data to request additional emergency responders promptly respond to the scene of the crash, such as via wireless communication and/or data transmission; (c) using or otherwise analyzing, via the one or more processors, the crash scene or drone data to estimate an amount of vehicle or building damage, and/or make recommendations to the insured to facilitate promptly repairing the vehicle or building damage, such as by generating recommendations regarding one or more reputable local vehicle or building (or home) repair companies that are then transmitted to a mobile device of the insured for their review or approval; (d) using or otherwise analyzing, via the one or more processors, the crash scene or drone data to identify potential buildup or otherwise adjust insurance claims upward or downward; and/or (e) using or otherwise analyzing, via the one or more processors, the crash scene or drone data to virtually reconstruct the crash scene, such as reconstruct events before, during, and/or after the crash, and/or determine fault for the crash, such as assign partial or whole fault for the crash to one or more participants or vehicles.

XII. EXEMPLARY METHODS OF NAVIGATING AUTONOMOUS DRONES

In one aspect, a computer-implemented method of collecting an autonomous or semi-autonomous drone data for insurance-related purposes may be provided. The method may include: (1) receiving, at one or more processors (or an associated transceiver) mounted on an autonomous or semi-autonomous drone, such as via wireless communication and/or data transmission sent from an emergency vehicle, an insurance provider, or other third party (such as a hospital, police department, or fire department) server or transceiver, a crash location (such as a GPS location or street address) associated with an insurance-related event, such as a vehicle crash, train or plane crash, house fire, earthquake, tornado, hurricane, or other catastrophe; (2) generating, at the one or more processors mounted on the autonomous or semi-autonomous drone, a pre-generated flight path for the autonomous or semi-autonomous drone based upon the crash location (such as determining a length and/or width of the crash scene, or a radius around the crash location (such as 25 or 100 meters)), the autonomous or semi-autonomous drone being mounted, or held securely in place, on an emergency response vehicle traveling to the crash location; and/or (3) once the emergency response vehicle arrives at the crash scene, autonomously or semi-autonomously flying (such as under the direction and control of the one or more processors mounted on the autonomous or semi-autonomous drone), the autonomous or semi-autonomous drone in accordance with the pre-generated flight path at the crash location to collect drone data (e.g., image, video, or audio data) associated with the crash to facilitate using the drone data for insurance-related activity.

In another aspect, a computer-implemented method of collecting an autonomous or semi-autonomous drone data for insurance-related purposes may be provided. The method may include (1) receiving, via or at one or more processors (or an associated transceiver) mounted on an emergency response vehicle, such as via wireless communication and/or data transmission sent from a transceiver associated with an insurance provider, or other third party (such as a hospital, police department, or fire department), a crash location (such as a GPS location or street address) associated with an insurance-related event, such as a vehicle crash, train or plane crash, house fire, earthquake, tornado, hurricane, or other catastrophe; (2) generating, at the one or more processors of the emergency response vehicle, a pre-generated flight path for an autonomous or semi-autonomous drone based upon the crash location (such as determining a length and/or width of the crash scene, or a radius around the crash location (such as 25 or 100 meters)), the autonomous or semi-autonomous drone being mounted, or held securely in place, on the emergency response vehicle traveling to the crash location; (3) uploading (or transmitted), via the one or more processors (or other processor), the pre-generated flight path to a processor of the autonomous or semi-autonomous drone, or memory unit thereof; and/or (4) once the emergency response vehicle arrives at the crash scene, autonomously or semi-autonomously flying (such as under the direction and control of one or more processors of the autonomous or semi-autonomous drone) the autonomous or semi-autonomous drone in accordance with the pre-generated flight path at the crash location to collect drone data (e.g., image, video, or audio data) associated with the crash to facilitate using the drone data for insurance-related activity.

The foregoing methods may include additional, less, or alternate actions, including those discussed elsewhere herein, and/or may be implemented via one or more local or remote processors (e.g., drone, emergency vehicle, or insurance provider processors), or via computer-executable instructions stored in a non-transitory computer readable medium or media. For instance, the method may include transmitting the drone data from the autonomous or semi-autonomous drone to an emergency response vehicle, emergency responder mobile device, third party remote server (e.g., police, hospital, fire department), or insurance provider remote server to facilitate processing the drone data for insurance-related purposes or activity. The insurance-related activity may include (i) using or otherwise analyzing, via the one or more processors, the crash scene or drone data to handle, adjust, and/or generate an insurance claim for the insured, such as an auto insurance claim, or a homeowners or renters insurance claim; (ii) using or otherwise analyzing, via the one or more processors, the crash scene or drone data to request additional emergency responders promptly respond to the scene of the crash, such as via wireless communication and/or data transmission; (iii) using or otherwise analyzing, via the one or more processors, the crash scene or drone data to estimate an amount of vehicle or building damage, and/or make recommendations to the insured to facilitate promptly repairing the vehicle or building damage, such as by generating recommendations regarding one or more reputable local vehicle or building repair companies that are then transmitted to a mobile device of the insured for their review or approval; (iv) using or otherwise analyzing, via the one or more processors, the crash scene or drone data to identify potential buildup or otherwise adjust insurance claims upward or downward; and/or (v) using or otherwise analyzing, via the one or more processors, the crash scene or drone data to virtually reconstruct the crash scene, such as reconstruct events before, during, and/or after the crash, and/or determine fault for the crash, such as assign partial or whole fault for the crash to one or more participants or vehicles.

XIII. EXEMPLARY COMPUTER SYSTEMS

In one aspect, a computer system for collecting autonomous, semi-autonomous, and/or other drone data for insurance-related purposes may be provided. The computer system may include one or more processors and/or transceivers configured to: (1) determine (such as via a local or remote GPS receiver or unit) or receive a crash GPS location associated with an insurance-related event; (2) generate a pre-generated flight path for an autonomous or semi-autonomous drone based upon the crash GPS location (such as a flight path centered about the crash GPS location, or built based upon or otherwise using the crash GPS location), the autonomous or semi-autonomous drone being mounted, or held securely in place, on an emergency response vehicle traveling to the crash location; (3) upload the pre-generated flight path to the autonomous or semi-autonomous drone (or alternatively, the drone generating the flight path after receiving the crash GPS location); (4) once the emergency response vehicle arrives at the crash scene, autonomously or semi-autonomously direct the flying the autonomous or semi-autonomous drone in accordance with the pre-generated flight path at the crash GPS location to generate or collect drone data associated with the crash; (5) generate or collect crash scene or drone data while the drone is flying the pre-generated flight path, or a portion thereof; (6) determine an extent of vehicle or building damage caused by the insurance-related event from computer analysis of the crash scene or drone data collected while the drone is flying the pre-generated flight path; and/or (7) use the extent of vehicle or building damage determined from computer analysis of the crash scene or drone data to facilitate mitigating further damage or for further insurance-related purposes.

The computer system may be configured to use or otherwise analyze the extent of vehicle or building damage determined from computer analysis of the crash scene or drone data to (i) handle, adjust, and/or generate an auto, homeowners, renters, personal articles, or other insurance claim for the insured; (ii) request additional emergency responders promptly respond to the scene of the crash via wireless communication and/or data transmission; (iii) estimate an amount of vehicle or building damage or make recommendations to the insured to facilitate promptly repairing the vehicle or building damage, such as by comparing images of an vehicle crash with historical images of crashes of varying damage amounts; (iv) identify potential buildup or otherwise adjust insurance claims upward or downward; and/or (v) virtually reconstruct the crash scene or assign partial or whole fault for the crash to one or more participants or vehicles (such as autonomous vehicles), or weather or construction conditions.

The computer system may be configured to (1) determine (a) the emergency vehicle has arrived at, or within the vicinity of the crash location (such as within 100 meters), or (b) has stopped moving or is otherwise parked; (2) once the emergency vehicle is at the crash location, automatically release or otherwise open one or more vehicle-mounted latches holding the autonomous or semi-autonomous drone in place on the emergency response vehicle; and/or (3) direct the autonomous or semi-autonomous drone to liftoff and fly around the crash location and collect crash scene data that may be used for insurance-related purposes. The computer system may also be configured to: once the autonomous or semi-autonomous drone is airborne at the crash scene, determine one or more obstacles (such as by performing object recognition techniques on digital images of the emergency scene acquired by the drone immediately or soon after liftoff) in a pre-generated or other flight path of the autonomous or semi-autonomous drone from computer analysis of the drone data initially collected at the crash scene; and/or automatically adjust the flight path of the autonomous or semi-autonomous drone at the crash scene to avoid the one or more obstacles detected via computer analysis of the recently gathered drone data (such as by directing the drone to fly around a tree or shrubs at a distance of 2 or more meters).

In another aspect, a computer system for collecting autonomous or semi-autonomous drone data for insurance-related purposes may be provided. The computer system may include one or more processors or transceivers configured to: (1) determine (such as via a GPS receiver or unit) or receive a crash GPS location associated with an insurance-related event; (2) generate a pre-generated flight path for an autonomous or semi-autonomous drone based upon the crash GPS location, including a length and/or width of the crash scene, or a radius around the crash GPS location, the autonomous or semi-autonomous drone being mounted, or held securely in place, on an emergency response vehicle traveling to the crash location; (3) upload the pre-generated flight path to the autonomous or semi-autonomous drone, or memory unit thereof (or generate the flight path directly via a drone-mounted controller or processor after the GPS location of the crash or emergency is determined by the drone-mounted GPS unit, or received via a drone-mounted transceiver); and/or (4) once the emergency response vehicle arrives at the crash scene, autonomously or semi-autonomously flying under the direction and control of the one or more processors the autonomous or semi-autonomous drone in accordance with the pre-generated flight path at the crash location to collect drone data associated with the crash to facilitate using the drone data for insurance-related activity.

The computer system may be configured to collect crash scene or drone data, via one or more autonomous or semi-autonomous drone or other processors, while the autonomous or semi-autonomous drone is flying, or otherwise operating via, the pre-generated flight path. The computer system may be configured to receive the crash scene or drone data transmitted from the autonomous or semi-autonomous drone; and store the crash scene or drone data in a memory unit for subsequent analysis. The computer system may be configured to analyze the crash scene or drone data; determine an extent of vehicle or building damage caused by the insurance-related event from computer analysis of the crash scene or drone data; and/or use the extent of vehicle or building damage determined from computer analysis of the crash scene or drone data to mitigate further damage and/or for further insurance-related purposes, including those discussed elsewhere herein.

In another aspect, a computer system for collecting autonomous or semi-autonomous drone data for insurance-related purposes may be provided. The computer system may include one or more processors or transceivers mounted on an autonomous or semi-autonomous drone; determine (such as using a locally-mounted GPS unit, or even a remote GPS unit) or receive a GPS crash location associated with an insurance-related event; generate a pre-generated flight path for the autonomous or semi-autonomous drone based upon the GPS crash location, the autonomous or semi-autonomous drone being mounted, or held securely in place, on an emergency response vehicle traveling to the crash location; and/or once the emergency response vehicle arrives at the crash scene, autonomously or semi-autonomously fly, under the direction and control of the one or more processors mounted on the autonomous or semi-autonomous drone, the autonomous or semi-autonomous drone in accordance with the pre-generated flight path at the crash location to collect drone data associated with the crash to facilitate using the drone data for insurance-related activity. The computer system may be configured to: transmit the drone data from the autonomous or semi-autonomous drone to an emergency response vehicle, emergency responder mobile device, third party remote server, or insurance provider remote server to facilitate processing the drone data for insurance-related purposes or activity.

The foregoing computer systems may include additional, less, or alternate functionality, including that discussed elsewhere herein.

XIV. ADDITIONAL CONSIDERATIONS

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method of collecting autonomous, semi-autonomous, and/or other drone data, the method comprising:

determining or receiving, via one or more processors, a crash GPS location associated with a crash location of a crash scene;

receiving, at the one or more processors, a generated flight path for an autonomous or semi-autonomous drone based upon the crash GPS location, the autonomous or semi-autonomous drone being mounted, or held securely in place, on an emergency response vehicle traveling to the crash location;

after the emergency response vehicle arrives at the crash scene, controlling, by the one or more processors, the autonomous or semi-autonomous drone to deploy from the emergency response vehicle and to autonomously or semi-autonomously fly in accordance with the generated flight path at the crash GPS location to generate or collect drone data associated with a crash at the crash scene, the drone data including digital images of the crash scene;

after the autonomous or semi-autonomous drone is airborne at the crash scene, identifying, by the one or more processors, from the digital images i) one or more objects; and ii) a height and/or location of the one or more objects;

comparing, by the one or more processors, the height and/or location of the one or more objects to the generated flight path to determine that the one or more objects are currently positioned in the generated flight path as a result of the crash at the crash scene;

identifying, by the one or more processors, the one or more objects as being one or more obstacles in the generated flight path based upon the comparison;

automatically adjusting, via the one or more processors, the generated flight path of the autonomous or semi-autonomous drone at the crash scene to avoid the one or more identified obstacles; and controlling, by the one or more processors, the autonomous or semi-autonomous drone to fly the adjusted generated flight path.

2. The computer-implemented method of claim 1, the method comprising:
determining, via the one or more processors, an extent of vehicle or building damage caused by the crash;
using or otherwise analyzing, via the one or more processors, the extent of vehicle or building damage determined from computer analysis of the drone data to handle, adjust, and/or generate an insurance claim for an insured.

3. The computer-implemented method of claim 2, the method comprising:
based upon the determined extent of vehicle or building damage, requesting additional emergency responders promptly respond to the crash scene via wireless communication and/or data transmission.

4. The computer-implemented method of claim 2, the method comprising:
based upon the determined extent of vehicle or building damage, estimating a repair or replacement cost of vehicle or building damage, or make recommendations to an insured to facilitate promptly repairing the vehicle or building damage.

5. The computer-implemented method of claim 2, the method comprising:
based upon the determined extent of vehicle or building damage, identifying potential buildup or otherwise adjusting insurance claims upward or downward.

6. The computer-implemented method of claim 1, the method comprising:
using or otherwise analyzing the drone data to virtually reconstruct the crash scene.

7. The computer-implemented method of claim 1, the method comprising:
determining, via the one or more local or remote processors, (a) the emergency response vehicle has arrived at, or within a vicinity of the crash location, or (b) has stopped moving or is otherwise parked;
once the emergency response vehicle is at the crash location, via the one or more local or remote processors, automatically releasing or otherwise opening one or more vehicle-mounted latches holding the autonomous or semi-autonomous drone in place on the emergency response vehicle; and
directing, via the one or more local or remote processors, the autonomous or semi-autonomous drone to liftoff and fly around the crash location and collect crash scene data.

8. A computer-implemented method of collecting autonomous, semi-autonomous and/or other drone data, the method comprising:
determining or receiving, via one or more processors, a crash GPS location associated with a crash location of a crash scene;
generating receiving, at the one or more processors, a generated flight path for an autonomous or semi-autonomous drone based upon the crash GPS location, including a length and/or width of the crash scene, or a radius around the crash GPS location, the autonomous or semi-autonomous drone being mounted, or held securely in place, on an emergency response vehicle traveling to the crash location;
after the emergency response vehicle arrives at the crash scene, controlling, under the direction and control of the one or more processors, the autonomous or semi-autonomous drone to deploy from the emergency response vehicle and to autonomously or semi-autonomously fly in accordance with the generated flight path at the crash GPS location to collect drone data associated with a crash at the crash scene, the drone data including digital images of the crash scene;
after the autonomous or semi-autonomous drone is airborne at the crash scene, identifying, by the one or more processors, from the digital images i) one or more objects; and ii) a height and/or location of the one or more objects;
comparing, by the one or more processors, the height and/or location of the one or more objects to the generated flight path to determine that the one or more objects are currently positioned in the generated flight path as a result of the crash at the crash scene;
identifying, by the one or more processors, the one or more objects as being one or more obstacles in the generated flight path based upon the comparison;
automatically adjusting, via the one or more processors, the generated flight path of the autonomous or semi-autonomous drone at the crash scene to avoid the one or more identified obstacles; and
controlling, by the one or more processors, the autonomous or semi-autonomous drone to fly the adjusted generated flight path.

9. The computer-implemented method of claim 8, the method comprising:
collecting the crash scene or the drone data, via one or more autonomous or semi-autonomous drones or other processors, while the autonomous or semi-autonomous drone is flying, otherwise operating via, the generated flight path.

10. The computer-implemented method of claim 8, the method comprising:
receiving, via the one or more processors, the drone data transmitted from the autonomous or semi-autonomous drone; and
storing, via the one or more processors, the drone data in a memory unit for subsequent analysis.

11. The computer-implemented method of claim 8, the method comprising:
analyzing, via the one or more processors, the drone data;

determining, via the one or more processors, an extent of vehicle or building damage caused by the crash from computer analysis of the drone data; and using, via the one or more processors, the extent of vehicle or building damage determined from computer analysis of the drone data to mitigate further damage.

12. The computer-implemented method of claim 11, further comprising:

using, via the one or more processors, the determined extent of vehicle or building damage to handle, adjust, and/or generate an insurance claim for an insured.

13. The computer-implemented method of claim 11, further comprising:

based upon the determined extent of vehicle or building damage, requesting additional emergency responders promptly respond to the crash scene via wireless communication and/or data transmission.

14. The computer-implemented method of claim 11, further comprising:

based upon the determined extent of vehicle or building damage, estimating an amount of vehicle or building damage, or make recommendations to an insured to facilitate promptly repairing the vehicle or building damage.

15. The computer-implemented method of claim 11, further comprising:

based upon the determined extent of vehicle or building damage, identifying potential buildup or otherwise adjusting insurance claims upward or downward.

16. The computer-implemented method of claim 8, further comprising:

using or otherwise analyzing the drone data to virtually reconstruct events before, during, and/or after the crash at the crash scene.

17. A computer-implemented method of collecting autonomous or semi-autonomous drone data, the method comprising:

determining or receiving, via one or more processors mounted on an autonomous or semi-autonomous drone, a GPS crash location associated with a crash scene;

receiving, at the one or more processors mounted on the autonomous or semi-autonomous drone, a generated flight path for the autonomous or semi-autonomous drone based upon the GPS crash location, the autonomous or semi-autonomous drone being mounted, or held securely in place, on an emergency response vehicle traveling to the GPS crash location; and after the emergency response vehicle arrives at the crash scene, controlling, under the direction and control of the one or more processors mounted on the autonomous or semi-autonomous drone, the autonomous or semi-autonomous drone to deploy from the emergency response vehicle and to autonomously or semi-autonomously fly in accordance with the generated flight path at the GPS crash location to collect drone data associated with a crash at the crash scene, the drone data including digital images of the crash scene;

after the autonomous or semi-autonomous drone is airborne at the crash scene, identifying, by the one or more processors, from the digital images i) one or more objects; and ii) a height and/or location of the one or more objects;

comparing, by the one or more processors, the height and/or location of the one or more objects to the generated flight path to determine that the one or more objects are currently positioned in the generated flight path as a result of the crash at the crash scene;

identifying, by the one or more processors the one or more objects as being one or more obstacles in the generated flight path based upon the comparison;

automatically adjusting, via the one or more processors, the generated flight path of the autonomous or semi-autonomous drone at the crash scene to avoid the one or more identified obstacles; and controlling, by the one or more processors, the autonomous or semi-autonomous drone to fly the adjusted generated flight path.

18. The computer-implemented method of claim 1, wherein the one or more processors are located on the autonomous or semi-autonomous drone.

19. The computer-implemented method of claim 8, wherein the one or more processors are located on the autonomous or semi-autonomous drone.

\* \* \* \* \*